(12) United States Patent
Haigh et al.

(10) Patent No.: US 7,732,768 B1
(45) Date of Patent: Jun. 8, 2010

(54) IMAGE ALIGNMENT AND TREND ANALYSIS FEATURES FOR AN INFRARED IMAGING SYSTEM

(75) Inventors: Peter Haigh, Cambridge (GB); Richard Salisbury, Cambridge (GB); Robin Tucker, Cambridgeshire (GB)

(73) Assignee: Thermoteknix Systems Ltd., Waterbeach, Cambridge (GB)

( * ) Notice: Subject to any disclaimer, the term of this patent is extended or adjusted under 35 U.S.C. 154(b) by 621 days.

(21) Appl. No.: 11/679,938

(22) Filed: Feb. 28, 2007

Related U.S. Application Data

(60) Provisional application No. 60/779,213, filed on Mar. 2, 2006.

(51) Int. Cl.
*H01L 31/02* (2006.01)
(52) U.S. Cl. .......... 250/332; 382/294; 250/370.08; 250/330; 348/179
(58) Field of Classification Search .......... 348/83, 348/179, 231.99; 352/39, 53; 430/348, 616; 250/339.09, 339, 370, 332, 330, 221; 382/294, 382/313, 103, 151, 201, 218, 165
See application file for complete search history.

(56) References Cited

U.S. PATENT DOCUMENTS

| | | | | |
|---|---|---|---|---|
| 4,991,007 | A * | 2/1991 | Corley | 348/188 |
| 6,396,961 | B1 * | 5/2002 | Wixson et al. | 382/294 |
| 6,591,161 | B2 | 7/2003 | Yoo et al. | |
| 6,765,663 | B2 | 7/2004 | Byren et al. | |
| 6,852,975 | B2 | 2/2005 | Riegl et al. | |
| 6,961,445 | B1 | 11/2005 | Jensen et al. | |
| 2001/0014221 | A1 | 8/2001 | Tomita | |
| 2002/0001036 | A1 * | 1/2002 | Kinjo | 348/231 |
| 2003/0025798 | A1 | 2/2003 | Grosvenor et al. | |
| 2003/0225325 | A1 | 12/2003 | Kagermeier et al. | |
| 2004/0019270 | A1 | 1/2004 | Takeuchi | |
| 2004/0201756 | A1 * | 10/2004 | VanBree | 348/239 |
| 2004/0245467 | A1 | 12/2004 | Lannestedt | |
| 2005/0210415 | A1 | 9/2005 | Bree | |
| 2005/0254548 | A1 | 11/2005 | Appel et al. | |
| 2006/0117108 | A1 * | 6/2006 | Salisbury et al. | 709/229 |
| 2007/0087311 | A1 * | 4/2007 | Garvey et al. | 434/21 |
| 2008/0099678 | A1 * | 5/2008 | Johnson et al. | 250/332 |

* cited by examiner

*Primary Examiner*—David P Porta
*Assistant Examiner*—Yara B Green
(74) *Attorney, Agent, or Firm*—Downs Rachlin Martin PLLC

(57) ABSTRACT

In one embodiment, a thermographic imaging device having a visual compare mode that allows a user to compare a live image of a subject to a previously captured image of the same subject to aid the user in aligning the live image with the previously captured image. In this manner, a user can capture a series of images of the subject with the device located and oriented at a common location and orientation that is consistent throughout the series. In another embodiment, trend analysis software that includes a thermographic tool copying feature for copying one or more thermographic tools from a tooled thermographic image file to one or more non-tooled thermographic image files. In some embodiments, the software includes a trend-graphing feature that generates one or more trend plots after one or more tools have been copied to one or more non-tooled thermographic image files.

28 Claims, 15 Drawing Sheets

2000

IMAGE ALIGNMENT AND TREND ANALYSIS FEATURES FOR AN INFRARED IMAGING SYSTEM

RELATED APPLICATION DATA

This application claims the benefit of priority of U.S. Provisional Patent Application Ser. No. 60/779,213, filed Mar. 2, 2006, and titled "Image Alignment and Trend Analysis Features for an Infrared Imaging System," which is incorporated by reference herein in its entirety.

FIELD OF THE INVENTION

The present invention generally relates to the field of thermography. In particular, the present invention is directed to image alignment and trend analysis features for an infrared imaging system.

BACKGROUND OF THE INVENTION

Infrared (IR) thermography systems are used in a variety of settings to capture, record and/or track temperature information. For example, thermography systems are used in building inspections for analyzing the thermal integrity of building envelopes, in electrical inspections for identifying abnormal temperatures of electrical components, e.g., motor windings, switchgear, transformers, etc., in mechanical inspections for identifying abnormal temperatures of mechanical components, e.g., rotational bearings or other components subject to frictional heating and in the monitoring of thermal processing and related equipment, e.g., kilns, metal forming equipment, furnaces, etc., for ensuring the processing temperatures remain within tolerances, among other things.

Conventional state-of-the-art thermography systems typically include one or more IR cameras, a computer, e.g., personal or laptop computer, and software that runs on each of the camera and computer for providing the camera and computer with various functionality relating to the capture, storage, transfer and manipulation of thermographic (and often corresponding visual) images and accompanying data within and between the camera and computer. An example of a conventional state-of-the-art IR/visible imaging camera is the VisIR® Ti200 camera available from Thermoteknix Systems Ltd., Cambridge, England. An example of conventional state-of-the-art IR/visible imaging camera control and thermography software is the Condition RED® software, also available from Thermoteknix Systems. Copies of brochures describing functionality of conventional versions of the VisIR® Ti200 camera and Condition RED® software are attached to the above-identified U.S. Provisional Patent Application as Exhibits A and B, respectively.

An important use of thermography systems is the tracking of a thermal condition of various items, or "assets," e.g., equipment, structures or components thereof, over a period of time as part of an ongoing monitoring program. In order to provide robust and meaningful condition monitoring, it is highly desirable that the images of each asset and the corresponding thermographic data acquired over time be captured from the same camera location and orientation and using the same camera and thermographic tool settings. Various schemes have been devised for locating a thermographic imaging camera at the same location at which a prior image was captured. One such scheme includes providing written instructions via a display on the camera itself. These instructions describe, typically in a prior thermographer's own words, the physical location of the camera when that thermographer captured the prior image. Another devised scheme includes providing a thermographic camera with a global positioning system (GPS) device that allows a thermographer to position the camera repeatedly in the same location using GPS data.

Each of these schemes has drawbacks. Neither of the schemes mentioned is highly accurate, leading to imprecision in actual camera location over a number of images. To correct for this imprecision, various tools, such as the PosiTrak® post-capture image alignment tool available from Thermoteknix, have been developed. The use of such tools, however, adds time and complexity to the processing of a series of images. Another drawback of conventional thermographic image alignment schemes is the lack of a convenient way to display the desired tool settings for capturing the next in a series of conditional monitoring images.

Once a series of thermographic images has been captured, downloaded to a computer and aligned with a prior image as needed, it is useful to create trend plots of the temperature data contained in those images. Typically, these plots involve determining one or more desired temperatures, e.g., maximum, minimum or average temperature or temperature at a desired location, for each of the images and then plotting these temperatures against time. Retrieving the desired temperature(s) of interest from each image typically involves applying one or more thermographic tools, such as a spot temperature tool, a maximum temperature tool, a minimum temperature tool and an area tool, to each of the thermographic images desired to be included in the trend plot. Generally, these tools extract the corresponding respective temperature data from the image file. For example, a spot tool determines the temperature at that exact spot on the image, a maximum temperature tool determines the maximum temperature represented by the thermographic image and so on. Locating the tool(s) on the respective thermographic images is generally a painstaking process that requires each image to be worked individually.

SUMMARY OF THE INVENTION

In one embodiment, the present disclosure is directed to a thermographic imaging device. The thermographic imaging device includes an imaging system configured to capture a live image and also includes an electronic display. A memory contains a reference image and thermographic tool data corresponding the reference image. A display driver is operatively configured to drive the display so as to display simultaneously each of the live image and the reference image for assisting a user in aligning the live image with the reference image.

In another embodiment, the present disclosure is directed to a thermographic camera. The thermographic camera includes an imaging system configured to capture a live image and further including an electronic display. A memory contains a previously captured image. A display driver is operatively configured to drive the electronic display so as to display an overlay comprising the live image and the previously captured image.

In a further embodiment, the present disclosure is directed to a method of capturing a thermographic image of a subject using a previously captured image of the subject. The method includes capturing a live image of the subject. The live image is displayed to a user. The previously captured image of the subject is displayed to the user simultaneously with the live image so as to allow the user to visually align the live image with the previously captured image. The live image is aligned with the reference image in response to aligning movements by the user. A thermographic still image of the live image is captured in response to user input when the live image and the reference image are aligned to the satisfaction of the user.

In yet another embodiment, the present disclosure is directed to a machine readable medium containing machine executable instructions for performing a method of capturing a thermographic image of a subject using a previously captured image of the subject. The machine executable instructions include a first set of machine executable instructions for capturing a live image of the subject. A second set of machine executable instructions is provided for displaying the live image to a user. A third set of machine executable instructions is provided for displaying the previously captured image of the subject to the user simultaneously with the live image so as to allow the user to visually align the live image with the previously captured image. A fourth set of machine executable instructions is provided for capturing, in response to user input, a thermographic still image of the live image when the live image and the reference image are aligned to the satisfaction of the user.

In still another embodiment, the present disclosure is directed to a method of manipulating a series of thermographic image files. The method includes storing a plurality of thermographic image files that comprises: 1) at least one tooled thermographic image file that includes a thermographic tool and 2) at least one non-tooled thermographic image file that does not include the thermographic tool, wherein the plurality of thermographic files have a corresponding respective plurality of file identifiers associated therewith. The plurality of file identifiers is displayed on an electronic display to a user. The thermographic tool is copied from the at least one tooled thermographic image file to the at least one non-tooled thermographic image file.

In yet still another embodiment, the present disclosure is directed to a machine readable medium containing machine executable instructions for performing a method of manipulating a series of thermographic image files. The machine executable instructions include a first set of machine executable instructions for storing a plurality of thermographic image files that comprise: 1) at least one tooled thermographic image file that includes a thermographic tool and 2) at least one non-tooled thermographic image file that does not include the thermographic tool, wherein the plurality of thermographic files have a corresponding respective plurality of file identifiers associated therewith. A second set of machine executable instructions is provided for displaying the plurality of file identifiers on an electronic display to a user. A third set of machine executable instructions is provided for copying the thermographic tool from the at least one tooled thermographic image file to the at least one non-tooled thermographic image file.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

At a relatively high level, the present disclosure is directed to features, variations of these features and ways of implementing these feature for assisting thermographers and others in efficiently and effectively implementing and carrying out a condition monitoring program. As described in the Background section above, condition monitoring involves capturing a series of thermographic images of a particular subject over a period of time. This series of thermographic images allows a user to track the trend(s) of any one or more temperatures of interest, e.g., maximum temperature, minimum temperature or temperature at a particular location on the subject at issue. Preferably, the thermographic images are captured by a thermographic imaging device located at the same location and orientation each time, and using the same thermographic camera settings, so as to maintain consistency throughout the series.

Figure 1:
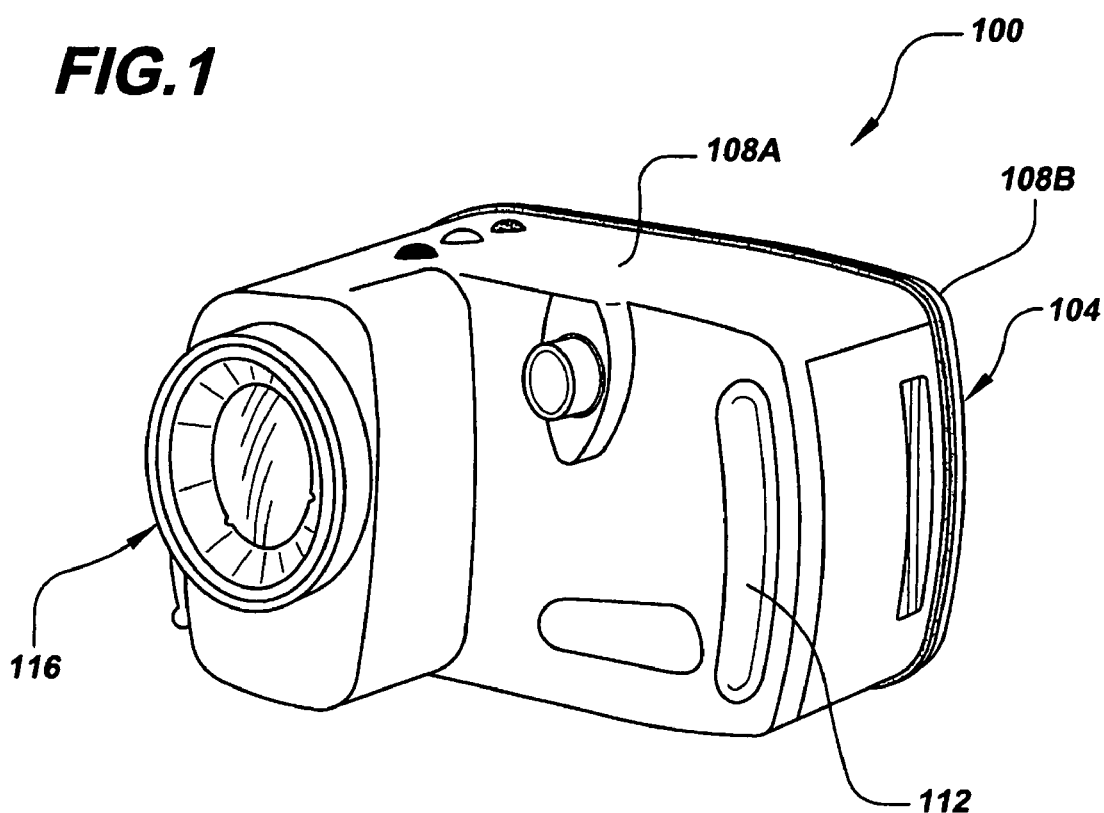
FIG. 1 is a front, perspective view of a thermographic imaging device that incorporates features for assisting a user in performing a condition monitoring program.

Referring now to the drawings, FIG. 1 illustrates an example 100 of a thermographic imaging device having features that assist a user (not shown) of the device in capturing one or more images from precisely or nearly the same device location and orientation at which another image was captured, by this device or another, similar device. Exemplary thermographic imaging device 100 is an electronic device that generates and captures electronic thermographic and/or visual images of a subject, such as an asset of a condition monitoring program. In one example, thermographic imaging device 100 is an IR/visible imaging camera similar to the VisIR® Ti200 camera mentioned in the Background section above.

Thermal imaging device 100 may include a housing 104 that contains and/or supports various components of the thermographic imaging device. Housing 104, here composed of housing pieces 108A-B, may be constructed of any of a variety of materials, including, without limitation, plastics, composites, metals, e.g., cast aluminum, and any combination thereof. In some cases, housing 104 may provide one or more features that assist the handling of thermographic imaging device 100, such as grip 112. Thermal imaging device 100 also includes one or more lenses 116, each comprising one or more optical lens elements (not shown) for creating an image of a subject on one or more thermographic and/or visual image sensors.

Figure 2:
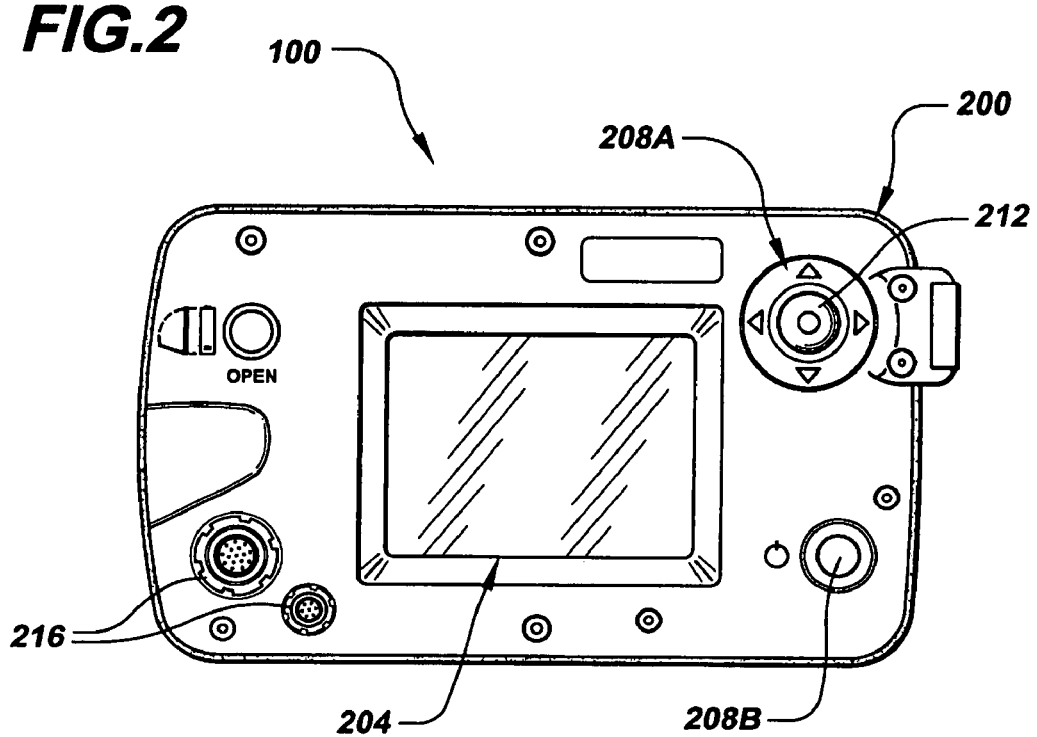
FIG. 2 is an elevational view of the backside of the thermographic imaging device of FIG. 1.

FIG. 2 illustrates a backside 200 of exemplary thermographic imaging device 100 of FIG. 1. Backside 200 may include one or more electronic displays, here a single display 204 that may be an LCD touch-screen or other sort of electronic flat-panel display. As described below in detail, in this example display 204 provides a number of functions, including a viewfinder for displaying one or more live images, a monitor for displaying one or more stored images and/or data relating to the live and/or stored images, a display for displaying one or more graphical tools and/or soft camera controls and an input device for receiving user input, e.g., via a finger or stylus, in conjunction with the graphical tools and/or soft camera controls. Backside 200 of thermographic imaging device 100 may also include one or more hard camera controls 208A-B for controlling functionality of the thermographic imaging device alone or in conjunction with soft camera controls accessed via display 204. In this example, hard camera control 208A comprises a joystick 212. Those skilled in the art will be readily familiar with the various types of soft and hard camera controls, such that they need not be described in any detail herein, other than to the extent necessary to describe how unique features of the present disclosure may be implemented.

Backside 200 of thermographic imaging device 100 may further include one or more data ports 216. Each data port 216 can provide a connection point for the transfer of data to and from one or more external devices, e.g., a computer, such as a laptop computer, an external storage device, a docking station, etc. As those skilled in the art will readily appreciate, examples of data port types that data ports 216 may include, without limitation, a parallel port, universal serial bus port, or any other standard or custom configuration port. Of course, the one or more data ports 216 may be located elsewhere on thermographic imaging device 100, such as the front, side, top or bottom.

Figure 3:
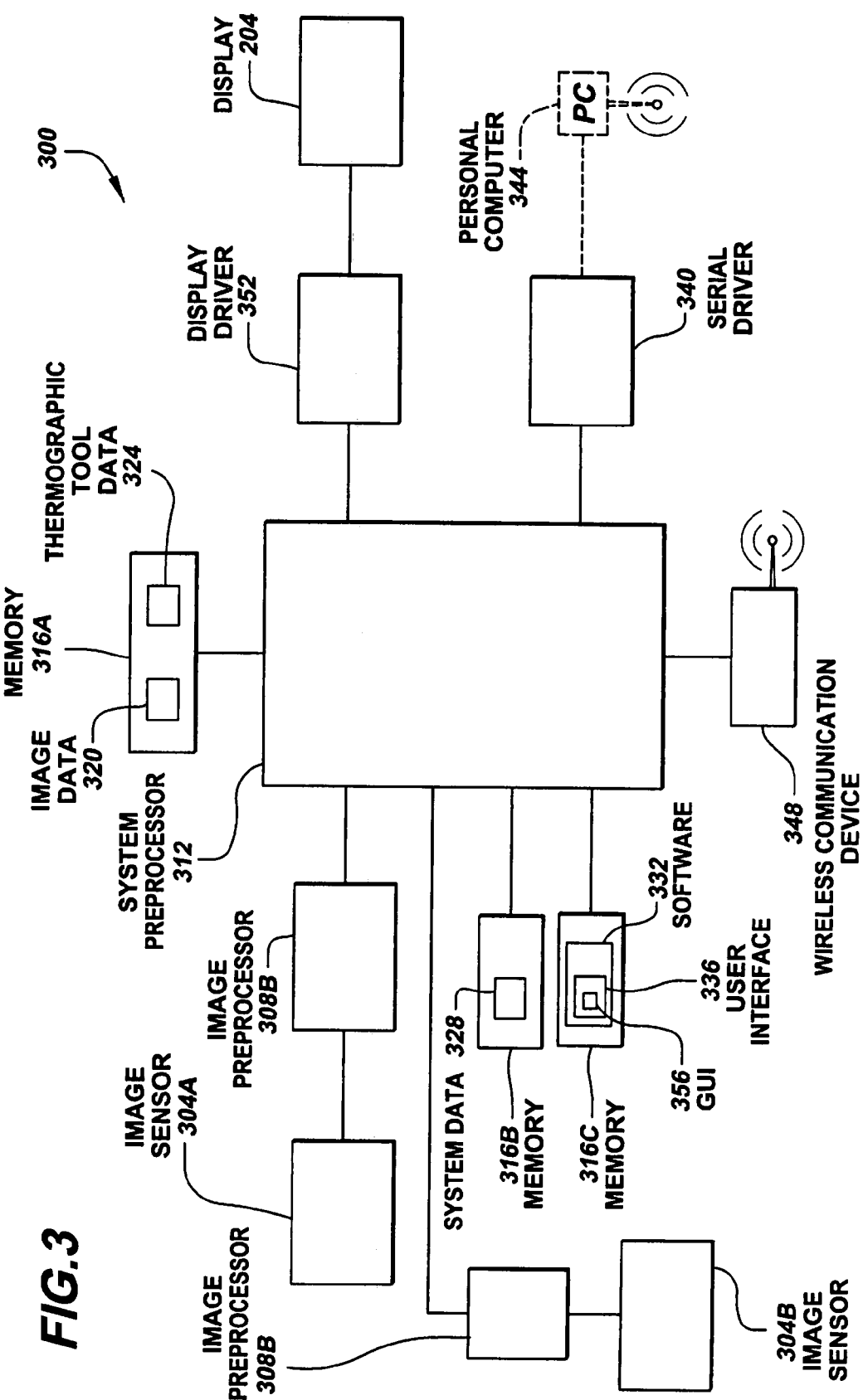
FIG. 3 is a block diagram of configuration of functional components of the thermographic imaging device of FIG. 1.

FIG. 3 illustrates an exemplary system configuration 300 of various components of thermographic imaging device 100 of FIGS. 1 and 2 that provide the thermographic imaging device with its functionality, including the unique functionality described below. Exemplary system configuration 300 includes one or more thermographic and/or visual image sensors, here one thermographic image sensor 304A and one visual image sensor 304B. As those skilled in the art will readily appreciate, each of image sensors 304A-B may be any suitable type. In one example, thermographic image sensor 304A is a microbolometer uncooled focal plane array, and visual image sensor 304B is a CMOS CCD 640×480 array with 24-bit color. Of course, these particular sensors are merely exemplary.

Each image sensor 304A-B may be in electrical communication with a respective image preprocessor 308A-B that performs predetermined signal processing functions on the raw output of the corresponding image sensor to provide a suitable processed signal for further use. It is noted that in other embodiments, the functionality of preprocessors 308A-B may be incorporated into a single preprocessor or even a multi-function or general-purpose processor, such as a system processor 312. Those skilled in the art will readily understand the function of preprocessors 308A-B such that further details need not be described in this disclosure. System processor 312 may be composed of one or more integrated circuits (ICs) that generally controls the overall operation of thermographic imaging device 100 (FIGS. 1 and 2) and any lower level functionality that a designer may relegate to system processor 312. Examples of an IC suitable for use as system processor 312 include, but are not limited to an application specific IC, a system-on-chip IC and a general-purpose processor IC.

System configuration 300 of thermographic imaging device 100 (FIGS. 1 and 2) may also include one or more memories 316A-C in electrical communication with system processor 312 for storing, among other things, image data 320, thermographic tool data 324, system data 328 and software 332 for controlling the thermographic imaging device and providing a user interface 336 to a user of the device for controlling the various functions and features of the device. As those skilled in the art will readily appreciate, each memory 316A-C may be of any suitable type including fixed and removable memory.

If, e.g., either data port 216 of FIG. 2 is of the serial type, system configuration 300 may further include a serial driver 340 in electrical communication with system processor 312 for facilitating information transmission between the system processor and external equipment, e.g., a personal computer 344. Serial driver 340 may communicate via any known data connection standard, such as, for example, RS-232. Of course, in other embodiments, if either data port 216 (FIG. 2) is of another type, serial driver 340 may be replaced by another driver of a suitable type. System configuration 300 may also include a wireless communication device 348 for communicating information to and from external equipment, such as personal computer 344. Examples of a wireless communication device suitable for use as wireless communication device 348 include, without limitation, a Bluetooth device (e.g., a IEEE 802.15.11 device), a Wi-Fi device (e.g., a IEEE 802.11 device), etc. System configuration 300 may also include a display driver 352 electrically coupled between system processor 312 and electronic display 204 for controlling the operation of the display, i.e., the display of screen images, including live and stored visual and thermographic images, thermographic tools, soft camera controls, etc. Those of ordinary skill in the art are familiar with display drivers that may be used for display driver 352 such that it is not necessary to describe display driver 352 in detail.

Figure 4:
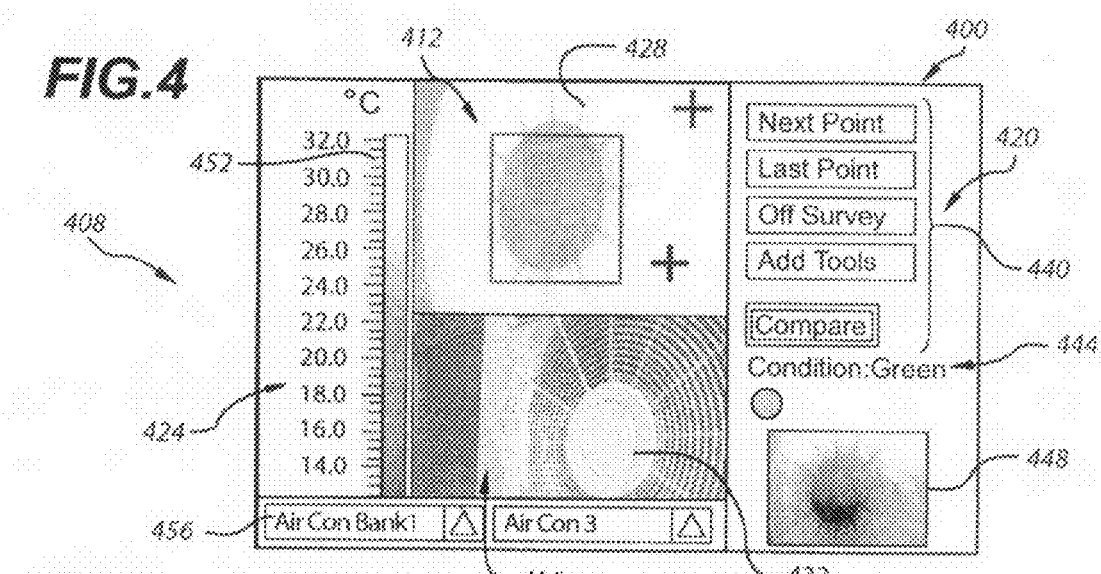
FIG. 4 is a screenshot of the graphical user interface (GUI) of FIG. 3 showing a survey mode of the GUI.
Figure 5:
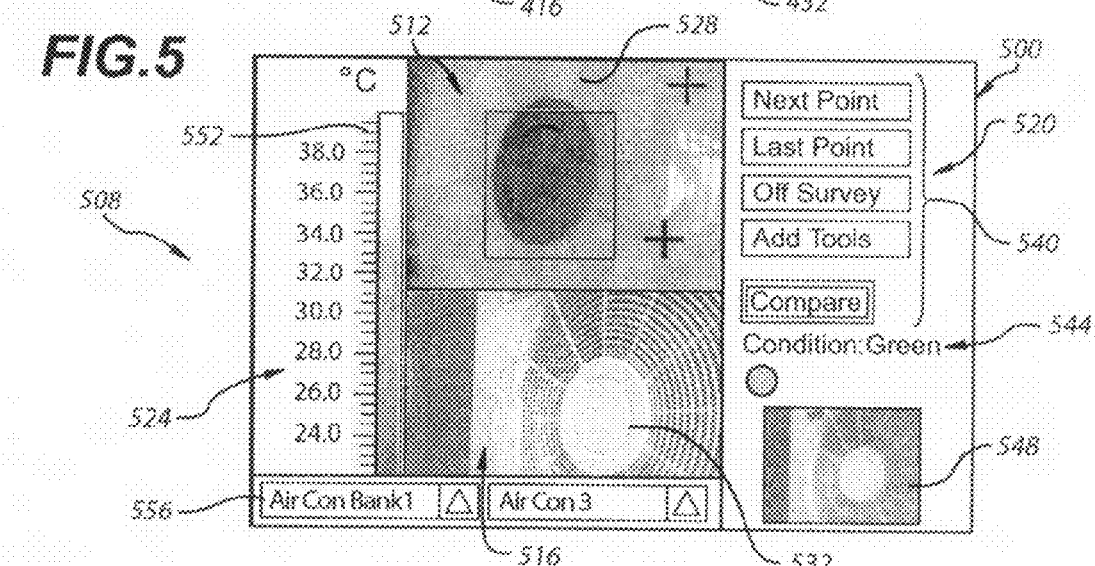
FIG. 5 is another screenshot of the GUI of FIG. 3 further illustrating the survey mode of FIG. 4.
Figure 6:
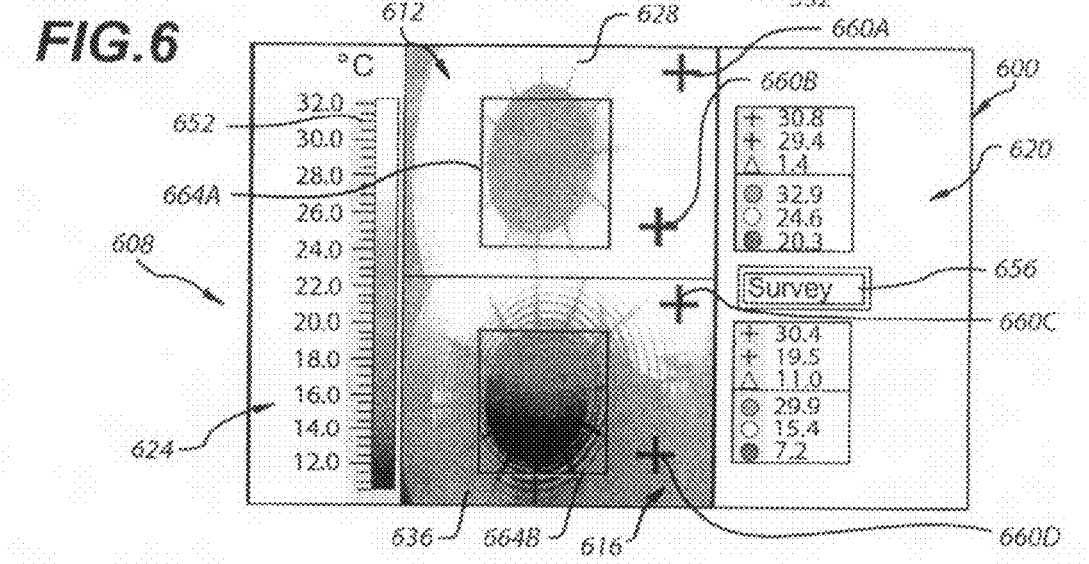
FIG. 6 is a screenshot of the GUI of FIG. 3 illustrating an image compare mode for assisting a user in locating and orienting the thermographic imaging device of FIGS. 1 and 2 in the same location and orientation that was used to capture a previously captured image.

Referring now to FIGS. 4-6, and also FIGS. 1-3, FIGS. 4-6 illustrate corresponding respective screenshots 400, 500, 600 of a graphical user interface (GUI) 356, which may be part of user interface 336 of FIG. 3. More particularly, screenshots 400, 500 show GUI 356 in an exemplary "survey" mode 408 as it would appear on display 204 (FIGS. 2 and 3). Mode 408 is designated as a "survey" mode in this example because it provides a user the ability to perform various functions relating to conducting a thermographic survey of one or more assets being monitored for their condition or that are otherwise the subject(s) of interest. Some of the features of survey mode 408 are described below in some detail.

In FIG. 6, screenshot 600 shows GUI 356 in an exemplary "compare" mode 608 as it would appear on display 204. As will be described below in detail, mode 608 is designated as a "compare" mode in this example because it allows a user to compare a live image to a stored image so as to allow a user to locate and orient thermographic imaging device 100 (FIGS. 1 and 2) so as to capture a new image of the subject of a reference image from nearly or exactly the same position and orientation from which the reference image was captured. Further details of compare mode 608 are described below. However, before providing details of survey mode 408 and compare mode 608, it is noted that screenshots 400, 500, 600 are merely exemplary of the appearance GUI 356 may present to a user via display 204. There are, of course, many variations that skilled artisans could devise that fall within the spirit of the present disclosure.

As can be readily seen in FIGS. 4-6, GUI 356 has a number of attributes that are common among screenshots 400, 500, 600. These common attributes include a first primary image region 412, 512, 612, a second primary image region 416, 516, 616, a general purpose region 420, 520, 620 and a temperature scale region 424, 524, 624. (It is noted that the various regions are the same across FIGS. 4-6. Differing element numerals are used here for the same element simply to assist the reader in quickly relating an element to the corresponding figure.) In this example, first primary image region 412, 512, 612 usually displays a live image of a subject 428, 528, 628 at which thermographic imaging device 100 (FIGS. 1 and 2) is aimed. Here, subject 428, 528, 628 is a portion of an air conditioning unit. This live image may be either a thermographic image (shown) or a visual image (not shown), as desired. Second primary image region 416, 516, 616, on the other hand, is used in this example for displaying either a live image 432, 532 (FIGS. 4 and 5) of subject 428, 528 when GUI 356 is in survey mode 408 or a stored reference image 636 (FIG. 6) when the GUI is in compare mode 608. It is noted that while stored reference image 636 of FIG. 6 is indeed an image of subject 628, if thermographic imaging device 100 were not aimed at subject 628 the subject matter of the stored reference image in second primary image region 628 would be different from subject 628 appearing in the live image of first primary image region 612. It is noted that the image appearing in second primary image region, whether it is a live image or reference image 636, may be either a thermographic image or a visual image, as desired.

In this example, general purpose region 420, 520, 620 of GUI 356 contains differing sets of information depending on whether the GUI is in survey mode 408 or compare mode 608. In survey mode 408 (FIGS. 4 and 5) general purpose region 420, 520 contains a number of soft control buttons 440, 540, here a "Next Point" button, a "Last Point" button, an "Off Survey" button, an "Add Tools" button and a "Compare" button. Each of these buttons 440, 540 may be selected by a user by touching display 204 at that button, e.g., using a finger (not shown) or a stylus (not shown). As their names imply, "Next Point" and "Last Point" buttons allow the user to move, respectively, forward and backward within the current survey to, e.g., move on to another asset or review an asset already updated on the survey, among other things. "Off Survey" button allows the user to capture visual and thermographic images and thermographic data for one or more subjects, e.g., assets, not part of the current survey. "Add Tools" button allows a user to add one or more thermographic tools, e.g., spot temperature tools, areal average temperature tools, etc., to a thermographic image as desired. "Compare" button allows a user to enter into compare mode 608 of GUI 356. The use of compare mode 608 during a survey or off-survey is described in more detail below.

Referring still primarily to FIGS. 4 and 5, general purpose region 420, 520 may also include a condition indicator 444, 544 that indicates the thermal condition of subject 428, 528 based on a comparison of thermographic data acquired during the current survey to stored baseline thermographic data. In this example, the condition of subject is indicated as being "Green," which on a scale of "Green," Yellow" "Red" indicates that the thermographic profile of subject 428, 528 is within a normal range.

In addition to soft buttons 440, 540 and condition indicator 444, 544, general purpose region 420, 520 may also include a reference thumbnail image 448, 548 of the subject matter of the current survey point. In this example, the current survey point is for subject 428, 528 and thermographic imaging device 100 (FIGS. 1 and 2) is aimed at subject 428, 528, thus, reference thumbnail image 448, 548 corresponds to the images in first and second primary image regions 412, 512, 416, 516. Reference thumbnail image 448, 548 may be either a thermographic image (FIG. 4) or a visual image (FIG. 5). In the present embodiment, a user can toggle reference thumbnail image 448, 548 between a thermographic image and a visual image simply by tapping display 204 (FIG. 2) within the area of the thumbnail image. Referring primarily to FIGS. 4-6, temperature scale region 424, 524, 624 may contain a temperature scale 452, 552, 652 that relates the colors (here levels of gray) of the thermographic image in first primary image region 412, 512, 612 to a numerical equivalent. The range of temperature scale 452, 552, 652 may be dynamic to suit needs of the corresponding thermographic image. When in survey mode 408 of FIGS. 4 and 5, GUI 356 (FIG. 3) may also present one or more subject identifiers 456, 556 that identify the subject matter of the current survey point. In this example, subject identifiers 456, 556 show that the current survey point is for air conditioning unit 3 on air conditioning bank 1.

Referring now primarily to FIG. 6, when GUI 356 (FIG. 3) is in compare mode 608, general purpose region 620 will typically contain information different from the information displayed here when the GUI is in survey mode 408 (FIGS. 4 and 5). In this example, in compare mode 608 general purpose region 620 contains a soft control button 656 for returning GUI 356 to survey mode 408. When one or more of the live and reference images within, respectively, first and second primary image regions 612, 616 are thermographic images, general purpose region 620 may also contain thermographic information relating to any thermographic tools, here spot temperature tools 660A-D and area temperature tools 664A-B.

In the present example, compare mode 608 works as follows. As mentioned above, when GUI 356 (FIG. 3) is in compare mode 608, first primary region 612 contains a live image (here a live thermographic image) and second primary image region 616 contains a stored reference image that was previously captured, either by thermographic imaging device 100 (FIGS. 1 and 2) or another similar device, e.g., during a prior survey or otherwise at an earlier time. As described in the Background section above, it is necessary in trend analysis to have a series of thermographic images of a particular subject, here subject 628, captured over a period of time. As also described, it is desirable that these periodically captured images be captured with the thermographic imaging device located and oriented in the same location and orientation. In this manner, the thermographic data collected is the most precise.

Consequently, to orient thermographic imaging device 100, which includes GUI 356 having compare mode 608, the user simply needs to move and orient the thermographic imaging device as needed until the live image in first primary image region 612 most nearly matches the stored reference image in second primary image region 616. In screenshot 600 of FIG. 6, it is seen that the live image in first primary image region 612 fairly nearly matches the stored reference image in second primary image region 616 in terms of the physical structure of subject 628. If the live and reference images are thermographic images, the user may have to visually compensate for differences in the images if the thermographic profiles of the two images differ from one another. This is readily seen in FIG. 6, where subject 628 in the live image is overall at a higher temperature than the subject is in the stored reference image. Once the live image most nearly or reasonably most nearly matches the stored reference image, the user may capture the live image as a still image, along with information regarding any thermographic tools applied to the live image at the time of capture.

In addition to assisting a user in matching the live image to the stored reference image, compare mode 608 may also assist the user in applying one or more thermographic tools, e.g., tools 660A-B, 664A to the live image in the same locations relative to subject 628 as tools 660C-D, 664B are located relative to the subject in the stored reference image. Once the user has reasonably most nearly matched the live image with the stored reference image and reasonably most nearly matched the placement of thermographic tools 660A-B, 664A with the locations of tools 660C-D, 664B, the user may then capture a still of the live image and the corresponding thermographic tool information. Then, not only will the images of a series of images taken over a period of time be captured from essentially the same location, but the captured thermographic tool information will be consistent throughout the series as well.

In working with GUI 356 (FIG. 3), a survey may proceed as follows. Assuming a user has already worked a current survey point, to proceed to the next survey point the user, working in survey mode 408 (FIGS. 4 and 5), would select the "Next Point" button. In response, GUI 356 would display a reference image for the next subject both as thumbnail 448, 548 and in second primary image region 416, 516. The user then locates the next subject, e.g., based on information displayed at subject identifiers 456, 556. After the user has moved to the next subject and is ready to capture thermographic information, the user enters compare mode 608 by selecting the "Compare" button from among buttons 440, 540 in general purpose region 520. GUI 356 enters compare mode 608 and simultaneously displays a live image of the subject in first primary image region 612 and a stored reference image of the subject in the second primary image region 616. The user then visually uses the stored reference image and live image to align the live image with the stored reference image while moving thermographic imaging device 100 to various locations and orientations relative to the subject. Once the images are aligned, the user may capture one or more still images of the live image, e.g., by activating an appropriate shutter release or other device. After thermographic imaging device 100 has captured one or more still images, the user may return GUI 356 (FIG. 3) to survey mode 408 (FIGS. 4 and 5) to, e.g., move to another survey point, capture an off-survey image or review already-worked survey points, among other things.

Figure 7:
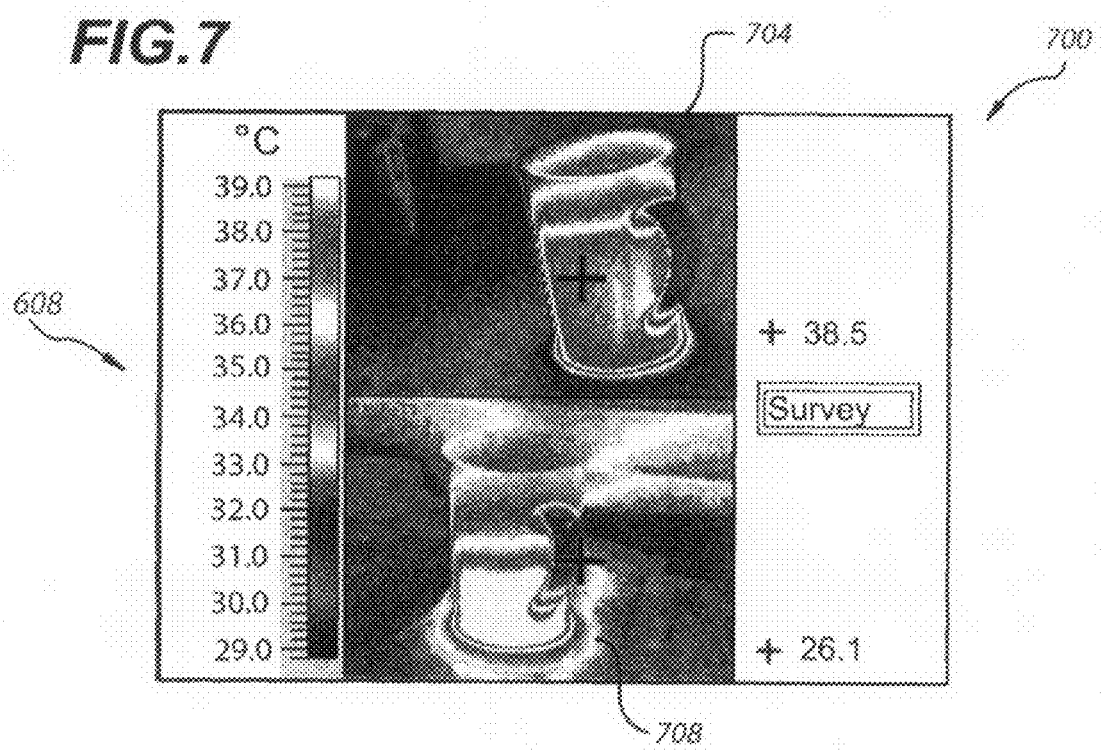
FIG. 7 is screenshot of the GUI of FIG. 3 illustrating the image compare mode of FIG. 6 in the context of a subject differing from the subject of FIGS. 4-6 wherein the subject is not aligned with a reference image.
Figure 8:
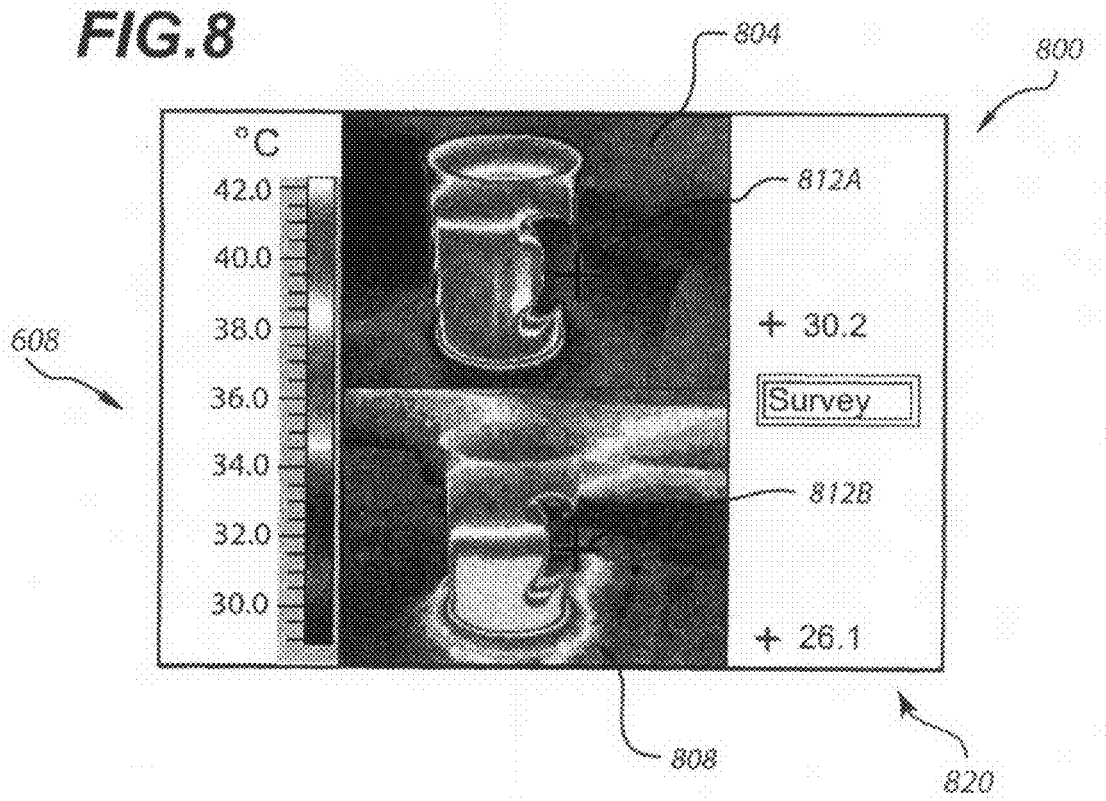
FIG. 8 is a screenshot of the GUI of FIG. 3 illustrating the subject of FIG. 7 in substantial alignment with the reference image.

FIGS. 7 and 8 are screenshots 700, 800 illustrating the compare mode 608 of GUI 356 with a subject (a drinking vessel) different from subject 628 of FIG. 6 and are provided primarily to illustrate the difference between a live image 704, 804 being out of alignment with a stored reference image 708, 808 and being in alignment with the stored reference image. In FIG. 7, live image 704 is clearly out of alignment with stored reference image 708, indicating that a user must change the location and/or orientation (here, both) of thermographic imaging device 100 (FIGS. 1 and 2) before capturing a still of live image 704 for a trend analysis. In FIG. 8, live image 804 substantially matches stored reference image 808, indicating that the user has found a location and orientation for thermographic imaging device 100 (FIGS. 1 and 2) that matches or nearly matches the location and orientation of the device used to capture the stored reference image. When live image 804 is as shown in FIG. 8, the user may capture a still image suitable for a trend analysis. It is noted that in this example, a single spot temperature tool 812A-B (FIG. 8) is applied to each of live and stored reference images 804, 808, with corresponding respective temperature data appearing in general purpose region 820.

In FIGS. 6-8, compare mode 608 of GUI 356 (FIG. 3) provides a reference image in close proximity to a live image but in an image region separate and distinct from the image region in which the live image is displayed. FIGS. 9-12, on the other hand, illustrate screenshots 900, 1000, 1100, 1200 of an alternative compare mode 904 in which a stored reference image is overlaid with a live image. This configuration can enhance the image alignment process by eliminating the need for the user to glance back and forth between two viewing regions and having to make estimates of the relative positions and orientations of the subject matter in the two viewing regions. By overlaying the live and reference images, primarily all a user has to do is move thermographic imaging device 100 (FIGS. 1 and 2) so that features of the live image exactly or reasonably nearly overlie and align with like features of the stored reference image. Examples of this image overlay compare mode 904 are described below.

Image overlay compare mode 904 may be implemented using the same GUI layout described in conjunction with FIGS. 6-8. That is, GUI 356 (FIG. 3) may provide a first primary image region 908, 1008, 1108, 1208, a second primary image region 912, 1012, 1112, 1212, a general purpose region 916, 1016, 1116, 1216 and a thermographic scale region 920, 1020, 1120, 1220. In each of FIGS. 9-12, first primary image region 908, 1008, 1108, 1208 displays simultaneously a live image 924, 1024, 1124, 1224 and a stored reference image 928, 1028, 1128, 1228, whereas second primary image region 912, 1012, 1112, 1212 displays only the stored reference image. In these examples, live image 924, 1024, 1124, 1224 and stored reference image 928, 1028, 1128, 1228 are thermographic images. However, it is noted that in other embodiments, either one or both of these images may be a visual image, if desired. It is also noted that thermographic tool features may be implemented in image overlay compare mode 904, e.g., in the same manner as described above for compare mode 608 of FIG. 6.

Figure 9:
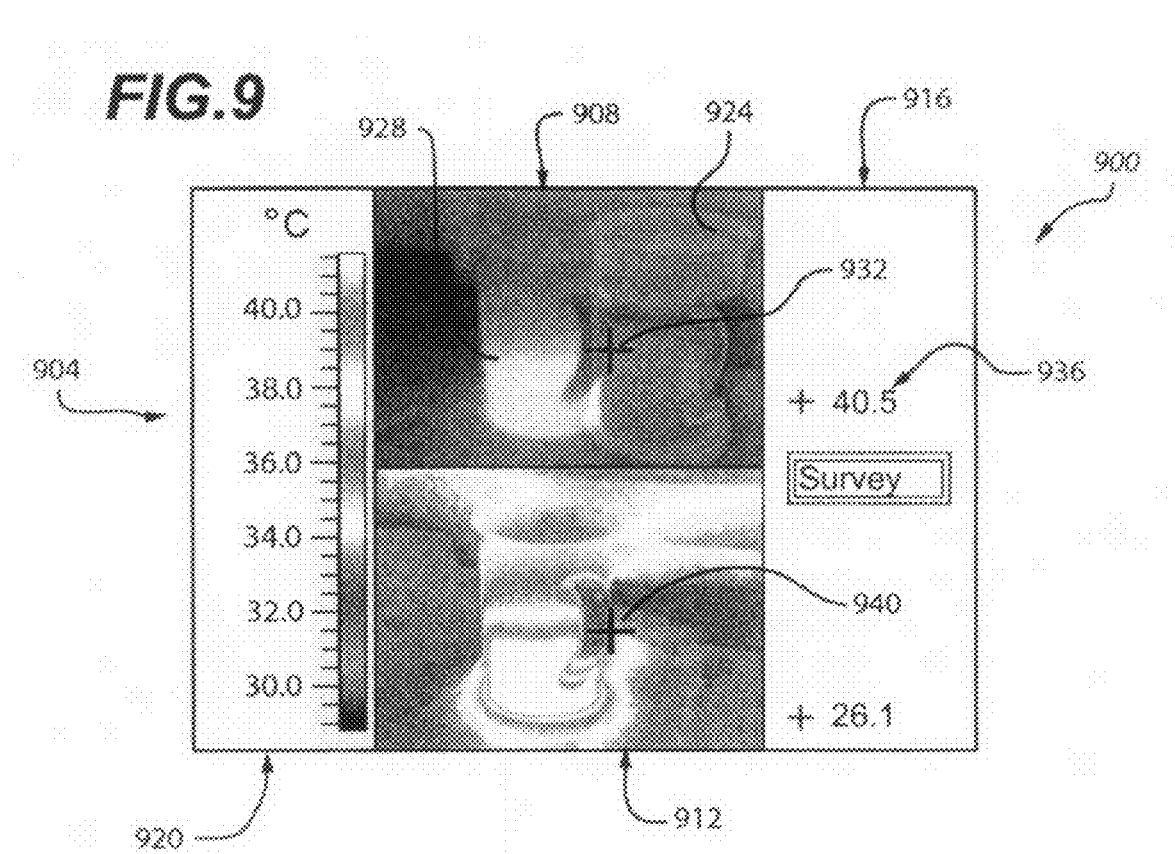
FIG. 9 is a screenshot of the GUI of FIG. 3 illustrating a image overlay compare mode for assisting a user in locating and orienting the thermographic imaging device of FIGS. 1 and 2 in the same location and orientation that was used to capture a previously captured image, wherein the subject is out of alignment with a reference image.
Figure 10:
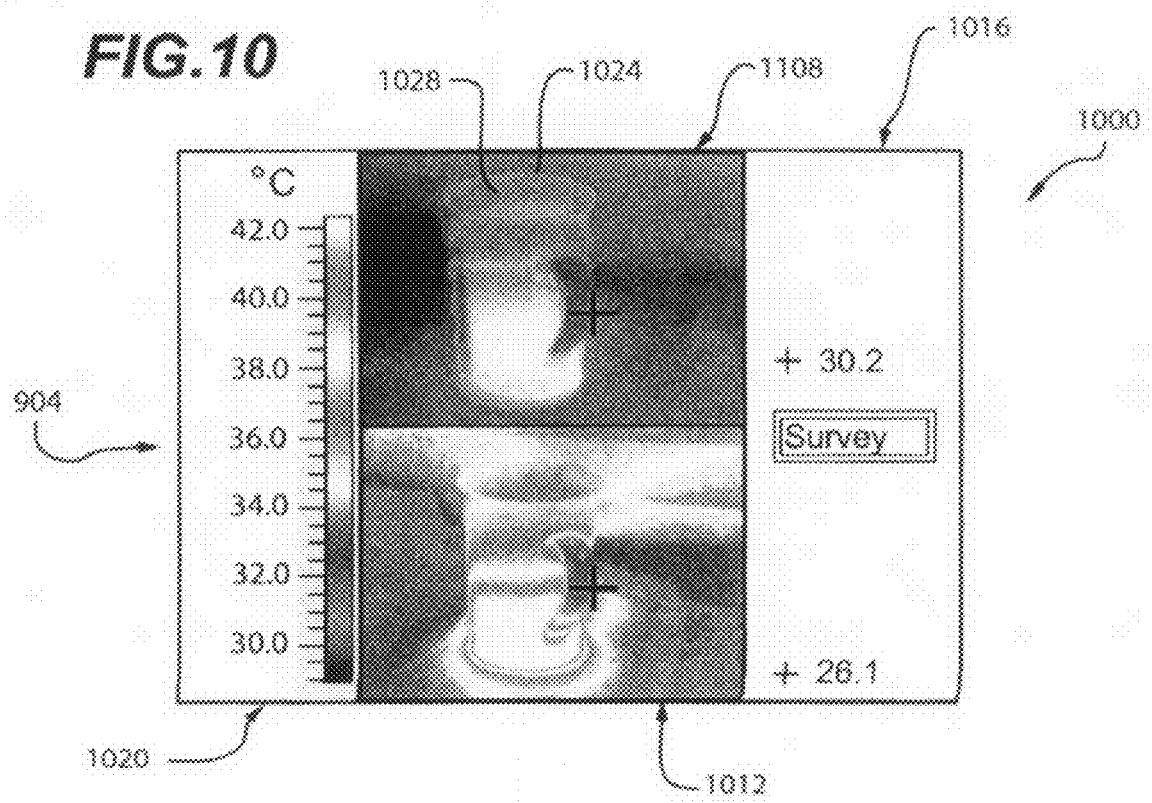
FIG. 10 is a screenshot of the GUI of FIG. 3 illustrating the subject of FIG. 9 in substantial alignment with the reference image.

Referring particularly to FIG. 9, this figure illustrates a situation in which live image 924 is out of alignment with stored reference image 928. Here, live image 924 is the result of, among other things, thermographic imaging device 100 (FIGS. 1 and 2) being too close to the subject and aimed improperly relative to stored reference image. Regarding spot temperature tool 932, it is noted that the corresponding temperature reading 936 in general purpose region 920 is the reading with respect to live image 924, not stored reference image 928. The spot tool temperature 940 is displayed next to second primary image region 912 that contains only the stored reference image. FIG. 10, on the other hand, illustrates a situation in which live image 1024 and stored reference image 1028 are substantially in alignment with one another. At this point, a user may capture a still image of live image 1024.

Figure 11:
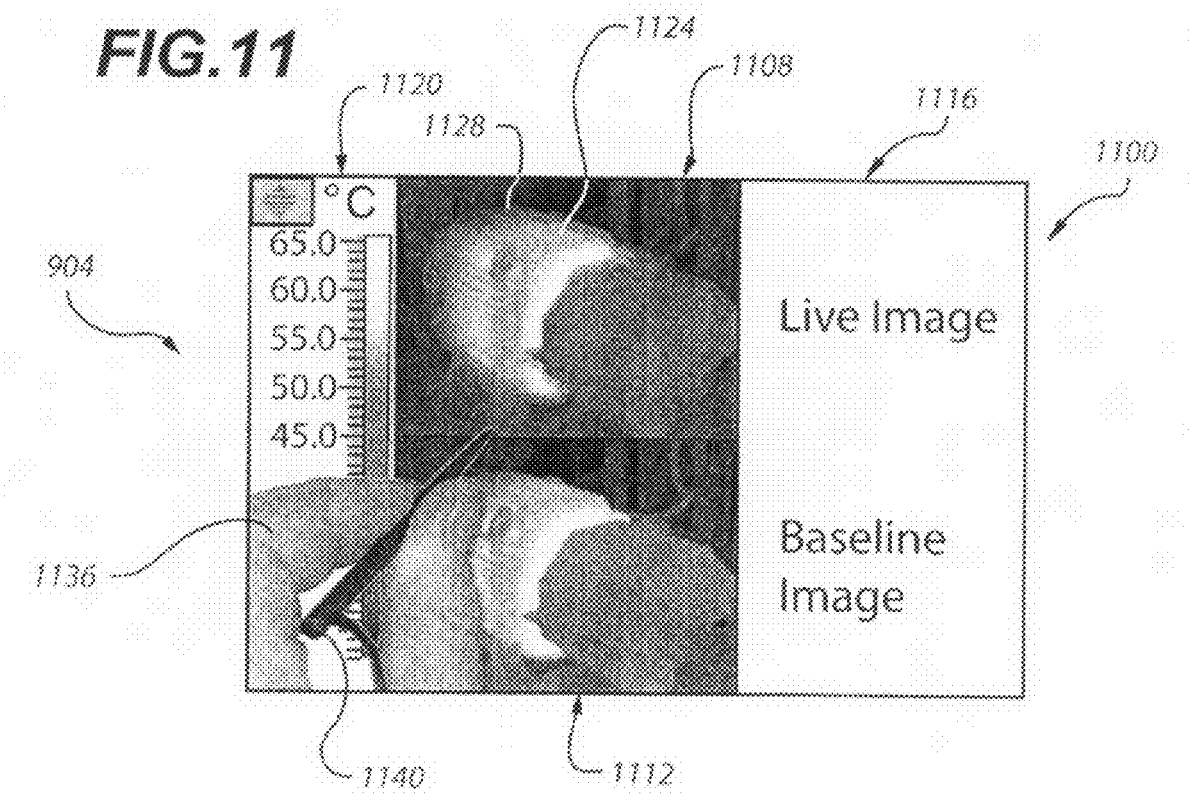
FIG. 11 is a screenshot of the GUI of FIG. 3 illustrating a variable relative intensity feature of an image overlay compare mode.
Figure 12:
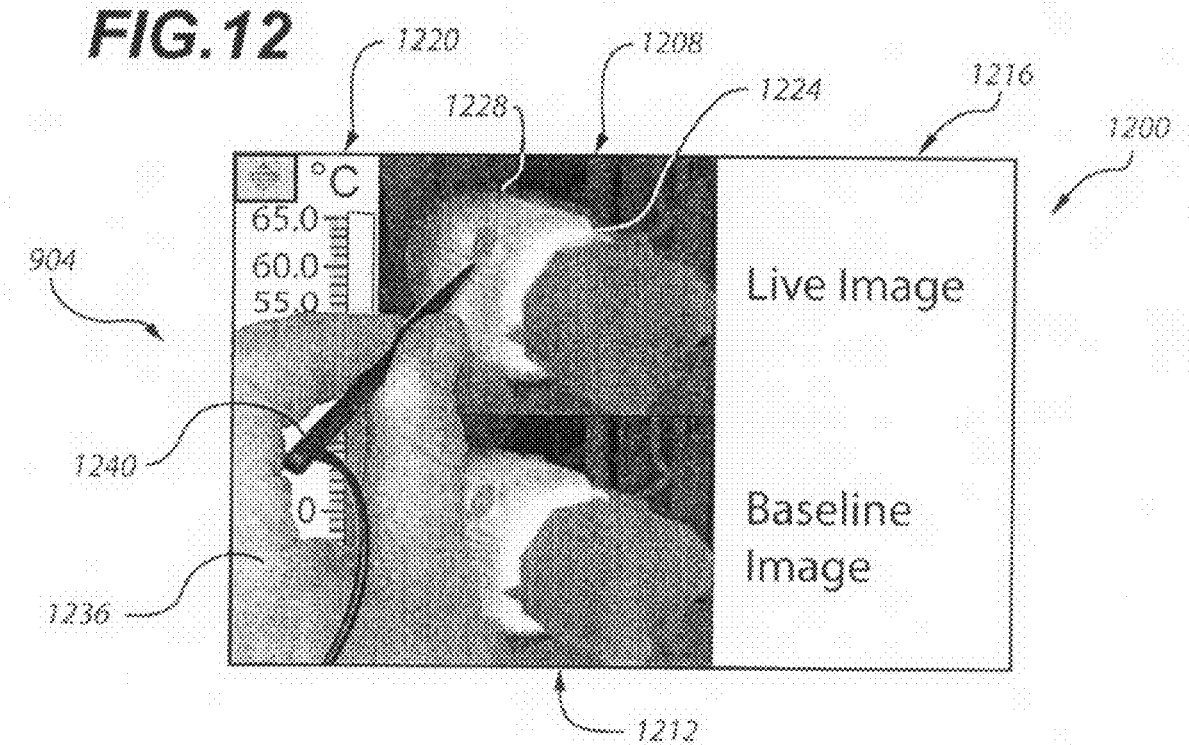
FIG. 12 is a screenshot of the GUI of FIG. 3 further illustrating the variable relative intensity feature of FIG. 11.

Referring to FIGS. 9 and 10, it is noted that in first primary image region 908, 1008 each of the simultaneously displayed live and reference images 924, 928, 1024, 1028 are not displayed at full intensity, but rather are displayed at a reduced intensity to enhance the visual impact of the overlay. In this example, each of live and reference images 924, 928, 1024, 1028 are displayed at 50/50 relative intensity so that each of the images is equally intense as the other. In some embodiments, the relative intensity of the live and reference images can be changed by the user, e.g., to suit personal preference or to fine tune the overlay mode to the particular images at issue. FIGS. 11 and 12 more particularly illustrate variable relative intensity features that may be incorporated into a GUI made in accordance with the present disclosure, such as GUI 356.

In FIG. 11 the relative intensity of live and stored reference images 1124, 1128 in first primary image region 1108 is the same as the relative intensity in first primary image regions 908, 1008 of FIGS. 9 and 10, respectively, i.e., 50/50. It is noted that live image 1124 in FIG. 11 is fairly nearly aligned with stored reference image 1128 such that the subject of the live image (here, an electric motor) appears to be a ghost of same subject of the stored reference image. In contrast, in FIG. 12 the relative intensity of live image 1224 to stored reference image 1228 is $25/75$, meaning the intensity of the live image is one-third of the intensity of the stored reference image. As in FIG. 11, live image 1224 is nearly aligned with stored reference image 1228 such that the subject of the live image merely appears as a relatively faint ghost of the same subject of the stored reference image.

In some embodiments, a user 1136, 1236 may enter a variable intensity mode by tapping on display 204 (FIG. 2) within second primary image region 1112, 1212, e.g., using a finger or stylus 1140, 1240. Once GUI 356 is in the variable intensity mode, user 1136, 1236 can change the relative intensity as desired to suit the situation at hand. In one example, user 1136, 1236 can change the relative intensity by changing the intensity of live image 1124, 1224, e.g., using joystick 212 or using a finger or stylus 1140, 1240. If joystick 212 is used, an upward movement of the joystick may increase the intensity of live image 1124, 1224 and a downward movement of the joystick may decrease the intensity of the live image. If a finger or stylus 1140, 1240 is used, display 204 (FIG. 2) display driver 352 (FIG. 3) and GUI 356 may be configured so that dragging the finger or stylus within second primary image region 1112, 1212 in a direction toward first primary image region on the display increases the intensity of live image 1124, 1224 and dragging the finger or stylus on the display within the second primary image region in a direction away from the first primary display region decreases the intensity of live image. In other embodiments, GUI 356 may be set up so that user 1136, 1236 can change only the intensity of stored reference image 1128, 1228 or each of the stored reference image and live image 1124, 1224.

It is noted that an image overlay compare mode, such as image overlay compare mode 904 of FIGS. 9-12, may provide in lieu of a non-overlay compare mode, such as image compare mode 608 of FIG. 6, or as an enhancement to such a non-overlay compare mode. If provided as an enhancement to a non-overlay image compare mode, a user may enter the overlay compare mode in any of a variety of ways. For example, if the display of the thermographic imaging device is touch sensitive, when the GUI is in the non-overlay compare mode, the user may enter the image overlay compare mode by tapping on the display within the second primary image region with, e.g., a finger or a stylus. In response to this tapping, the GUI may add the stored reference image to the first primary image region. To exit the overlay compare mode, the user may tap with a finger or stylus within the first primary image region. Those skilled in the art will readily appreciate that there are many other ways to enter and exit an image overlay mode, such as by soft buttons (not shown) displayed in the general purpose region and/or hard buttons (not shown) that are part of the thermographic imaging device.

It is further noted relative to FIGS. 9-12 in connection with stored reference image 928, 1028, 1128, 1228 displayed within first primary image region 908, 1008, 1108, 1208 that this image may, but need not necessarily, be a monochromatic image. Under certain conditions, a monochromatic version of stored reference image 928, 1028, 1128, 1228 may aid a user in visually distinguishing between the stored reference image and live image 924, 1024, 1124, 1224 during alignment. Thermographic imaging device 100 (FIGS. 1 and 2) may be provided with a feature (not shown), e.g., a soft or hard button, that allows the user to toggle stored reference image 928, 1028, 1128, 1228 between a monochrome image and a full-color image.

Figure 13:
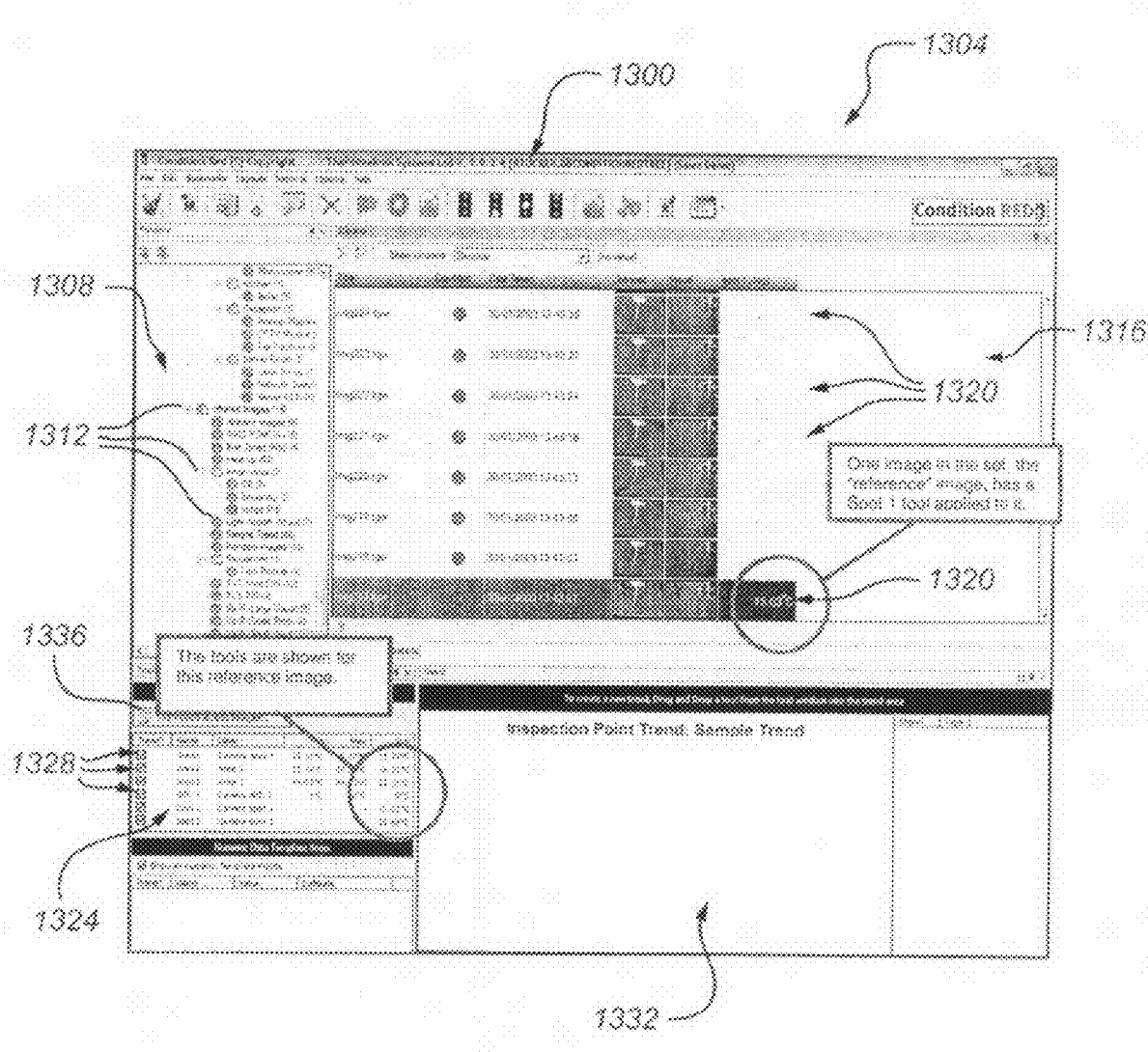
FIG. 13 is a screenshot of a GUI of trend analysis software.

Referring now to FIGS. 13-18, these figures are used hereinbelow to illustrate various features that assist a user in performing trend analysis of a series of like images, e.g., a series of images of a common subject taken over a period of time, such as described above relative to thermographic imaging device 100 (FIGS. 1 and 2). The general concept of trend analysis is well known in the art, and, therefore, no additional explanation is provided herein. FIG. 13 is a screenshot 1300 of an exemplary user interface, here, GUI 1304, of thermography software made in accordance with the present disclosure. As those skilled in the art will readily recognize, such software may be run on any suitable computer (not shown), e.g., a personal computer (such as personal computer 344 of FIG. 3), a laptop computer, a handheld computer, etc. As described in more detail below, GUI 1304 includes thermographic tool copying features and trend analysis features that greatly simplify the actions a user must take in creating trend analysis charts, graphs or other analytical items.

With continuing reference to FIG. 13, GUI 1304 may include a number of display regions, such as, e.g.: 1) a file structure region 1308 that displays file folders 1312 in a hierarchical order; 2) a folder contents region 1316 that displays information corresponding to the files, here thermographic image files 1320, stored in the folder selected in the file structure region; 3) a tool set region 1324 that displays information relating to the thermographic tools 1328 contained in a currently selected one of the thermographic image files listed in the folder contents region; and 4) a trend graphics region 1332 for containing a graph of temperature versus time for a selected thermographic tool once that tool is applied to the series of image files listed in the folder contents region as discussed below. The general concept of thermographic tools is well-known in the art and, therefore, need not be described herein. While GUI 1304 is shown having a particular arrangement of regions 1308, 1316, 1324, 1332, those skilled in the art will readily appreciate that other arrangements may be used to suit a particular GUI design. Moreover, those skilled in the art will readily appreciate that GUI 1304 can be readily adapted to virtually any computer operating system known in the art, such as, but not limited to, LINUX, Microsoft WINDOWS, VISTA, etc., UNIX, and Macintosh. GUI 1304 may also include other regions as needed for the particular instantiation of software incorporating one or more of the features of the present disclosure.

Using the file and folder structure shown, it would be customary, though not imperative, to store a series of like thermographic images for a particular subject under consideration (e.g., asset) in a single one of folders 1312. Then, when a user selects one of folders 1312 from within file structure region 1308, e.g., by "pointing and clicking on it" using a mouse or other user input device, information regarding the image files containing the series of images may be displayed in folder contents region 1316. In this example, each row entry in folder contents region 1316 corresponds to a respective thermographic image file. When a user selects a particular one of thermographic image files 1320 in folder contents region 1316, e.g., by "pointing and clicking on it," GUI 1304 may display the thermographic tools 1328 contained in that file, if any, in tool set region 1324.

Assuming, for this illustration, that only one of thermographic image files 1320 initially contains any thermographic tools 1328 (here, the highlighted file), a trend analysis cannot be performed until at least one other, and typically all other, of the image files contain the one or more thermographic tools desired to be the subject of the trend analysis and the trend graph in trend graphics region 1332. To provide one or more of the "non-tooled" thermographic image files 1320, i.e., the ones of the thermographic image files that do not already have applied thereto the desired thermographic tool(s) 1328, with the desired thermographic tools, the user may take a particular action that results in the automatic copying by the software of the desired one(s) (or all) of the thermographic tool(s) to one or more (typically all) of the non-tooled thermographic image files 1320. Copying of the one or more thermographic tools to one or more non-tooled thermographic image files 1320 means that at least some, and typically all, of the properties of each tool are copied to each non-tooled thermographic image file. Examples of tool properties include, the tool's position, emissivity, name, label, background and type, among others. Those having ordinary skill in the art will readily understand from a programming perspective how to provide the software with this automatic copying functionality.

Figure 14:
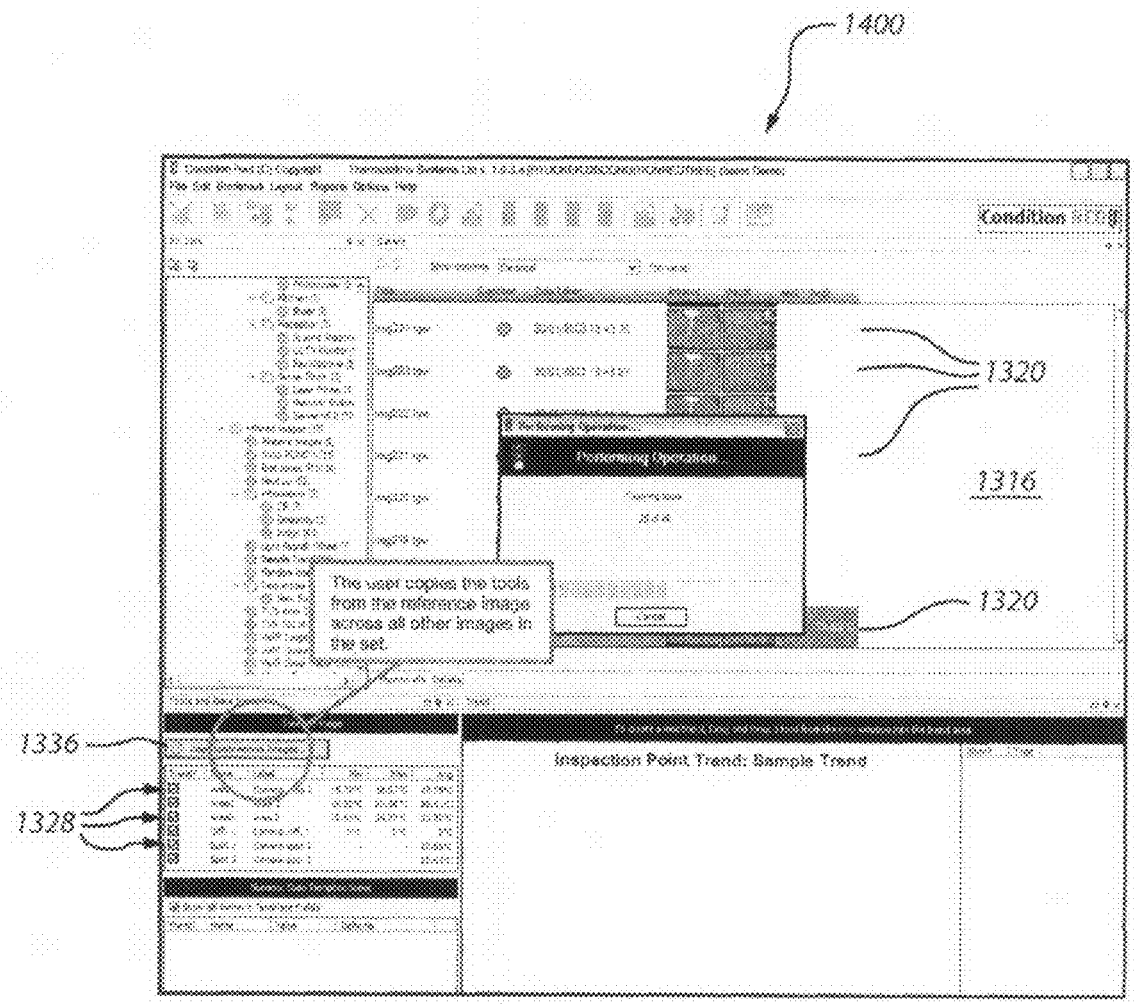
FIG. 14 is a screenshot of the GUI of FIG. 13 illustrating a thermographic tool copying feature of the trend analysis software.

In one example, tool set region 1324 is provided with a soft button 1336 or other soft control that copies all of the thermographic tools displayed in the tool set region to each of the non-tooled thermographic image files 1320 represented in folder contents region 1316. Once the user activates soft button 1336, the software may carry out the copying without further action on the user's part. FIG. 14 shows a screenshot 1400 taken while a thermographic tool 1328 is being copied to each of the initially non-tooled thermographic image files 1320. In other embodiments (not shown), the activation of soft button 1336 may open a dialog box that allows the user to select which thermographic tool(s) 1328 to copy and/or which thermographic image files 1320 to copy the tool(s) to. This may be useful when trend information is desired for fewer than the number of thermographic tools in the thermographic image file having the greatest number of tools in a particular folder and/or if it is desired that not all thermographic image files in a folder be represented in a trend graph. In yet other embodiments, soft button 1336 may be supplemented or replaced with a drag and drop feature that allows the user to select in folder contents region 1316 the one(s) of the non-tooled thermographic image files to which the desired thermographic tool(s) 1328 are to be copied and then drag and drop the selected file(s) onto the file from which the tool(s) are to be copied. Once the user drops the one or more non-tooled thermographic files 1320 onto the desired tooled thermographic image file, the software would copy the tools from the tooled thermographic image file 1320 to the selected non-tooled thermographic image file(s).

Figure 15A:
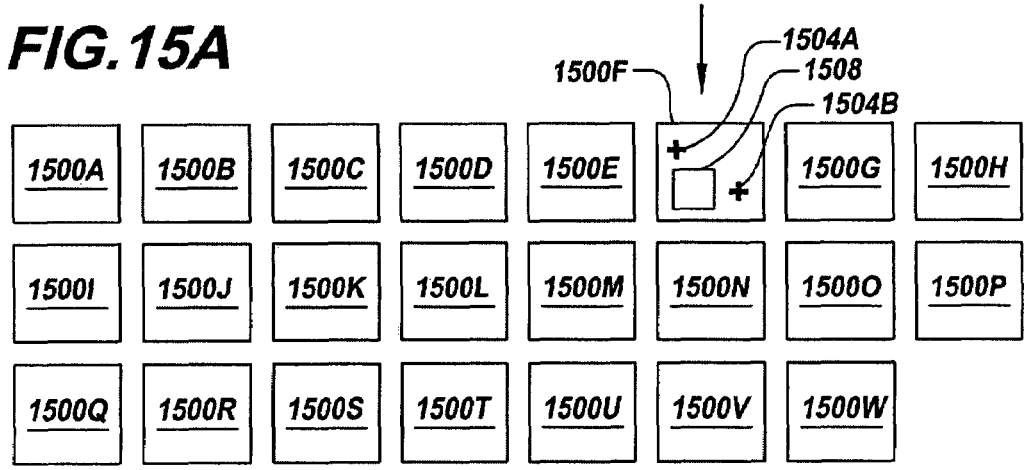
FIG. 15A is block diagram illustrating the selection of a tooled thermographic image file for use in copying the thermographic tools therein to a plurality of non-tooled thermographic image files.
Figure 15B:
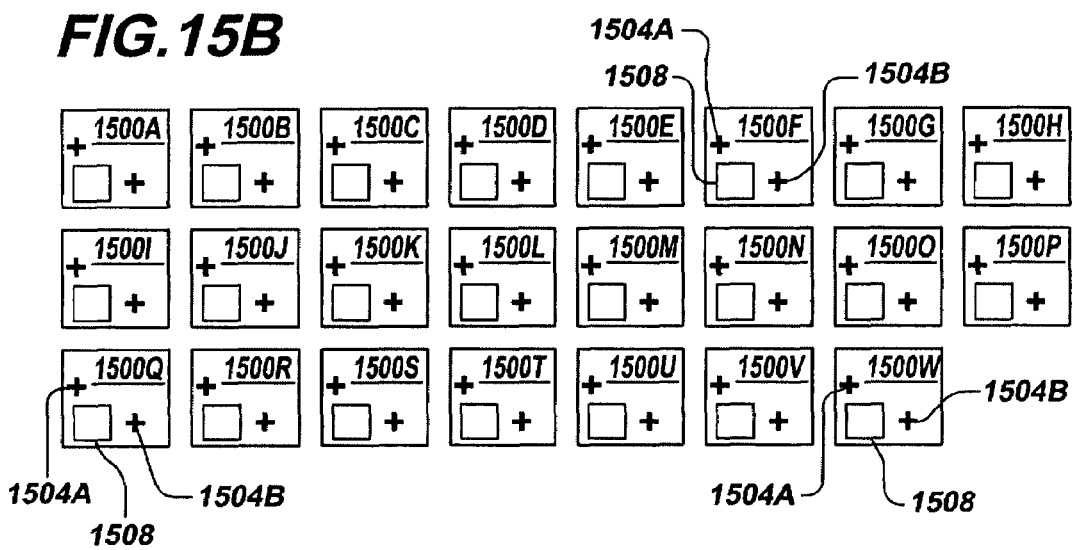
FIG. 15B is a block diagram illustrating the effect of copying the thermographic tools from a selected thermographic image file to the plurality of non-tooled thermographic image files.

Referring to FIGS. 15A-B, and also to FIG. 13, FIGS. 15A-B illustrate an example in which, as seen particularly in FIG. 15A, only one of the thermographic image files 1500A-W, i.e., image file 1500F, initially contains any thermographic tools, in this case, two spot temperature tools 1504A-B and an areal average temperature tool 1508. To copy thermographic tools 1504A-B, 1508, a user may select image file 1500F, e.g., by clicking on the file identifier on screen as described above, and then initiate tool copying, e.g., by selecting soft button 1336 (FIG. 13). Upon/following activation of soft button 1336, the software then copies thermographic tools 1504A-B, 1508 from thermographic image file 1500F to all of the other thermographic image files, i.e., image files 1500A-E, 1500G-W, as represented in FIG. 15B. Following the copy operation, all of thermographic image files 1500A-W contain the same thermographic tools 1504A-B, 1508, and these image files are now ready for trend analysis, if desired.

Figure 16:
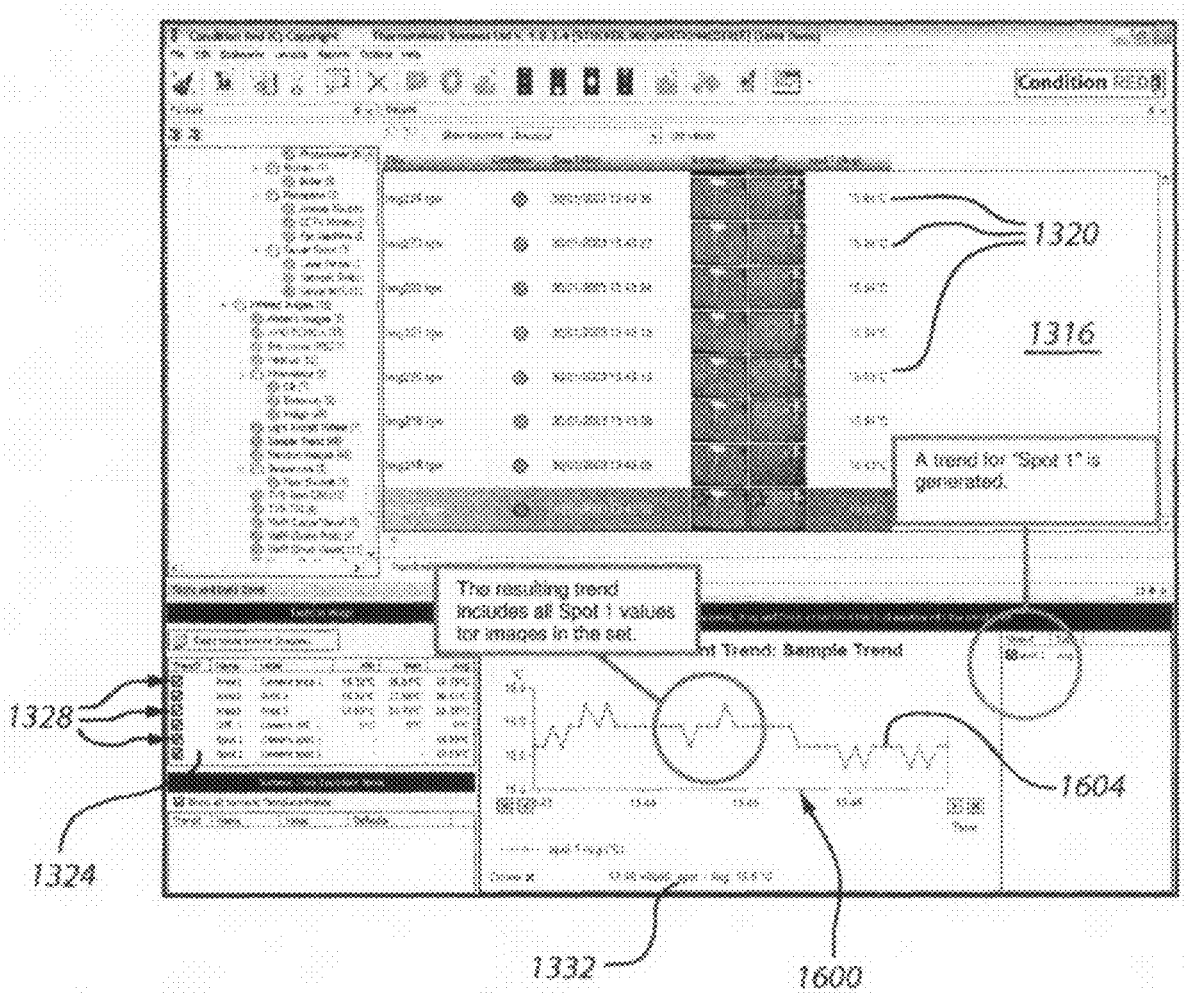
FIG. 16 is a screenshot of the GUI of FIG. 13 illustrating the ability of the software to generate a trend graph.

Referring to FIG. 16, once at least one of the thermographic image files 1320 contains one or more of the same thermographic tools, the user can initiate the generation of a trend graph, such as trend graph 1600 shown in trend graphics region 1332. To cause the software to generate a trend graph for each of one or more desired thermographic tools for at least some of thermographic image files 1320 represented in folder contents region 1316, the user may, e.g., select the desired thermographic tool(s) 1328 to be graphed from within tool set region 1324 and then drag and drop the selected tool(s) to trend graphics region 1332. The software may then retrieve the temperature and time data from the ones of thermographic image files containing the selected tool(s) and generate the trend graph. In the example shown, trend graph 1600 contains only one trend plot 1604, since only one thermographic tool 1328, the "Spot 1" tool was selected for graphing. If two or more thermographic tools are selected for graphing, the corresponding trend graph may contain a corresponding number of trend plots.

As those skilled in the art will readily appreciate, there are other ways to initiate the generation of a trend graph such as trend graph 1600 other than dragging and dropping. For example, a soft button (not shown) may be provided. When a user activates this button, the GUI/software may display a dialog box that requires the user to input the tool(s) desired to be represented in the graph. Such a dialog box may also ask the user to select the period of time over which the graph is to extend. In alternative embodiments, software may be configured such that once the software has copied the desired thermographic tool(s) to all of the desired non-tooled thermographic image files, the software may automatically generate the corresponding trend graph. Configuring the software for this and other unique functionality disclosed herein is within the ordinary skill in the art.

Figure 17A:
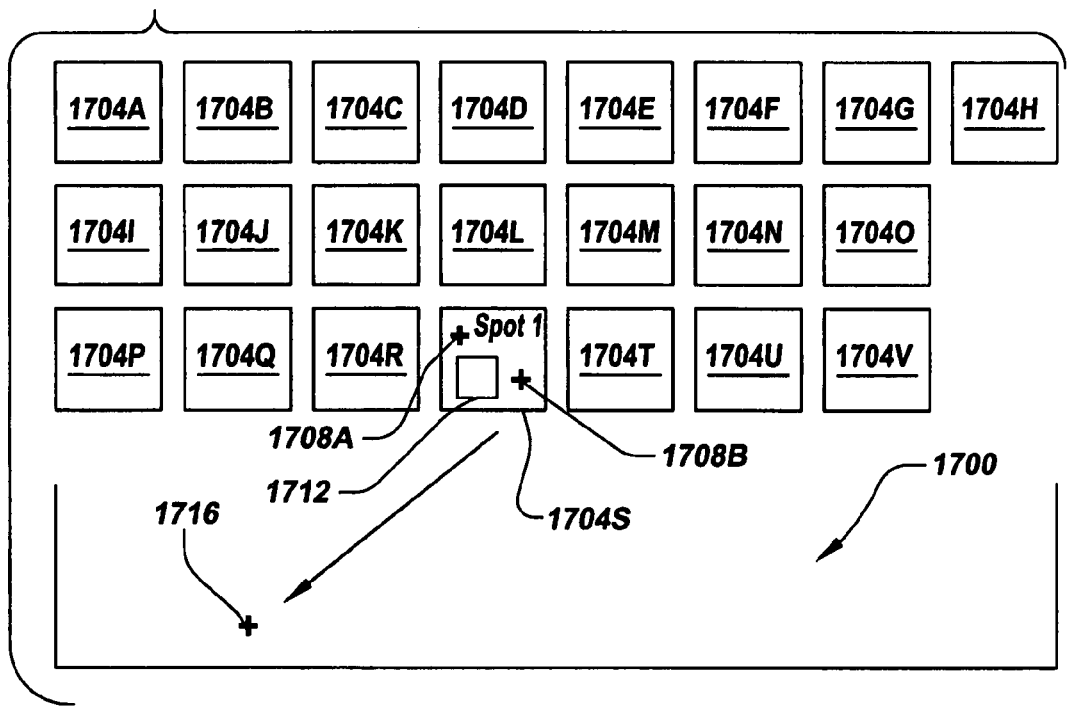
FIG. 17A is a block diagram and corresponding trend graph for a plurality of thermographic image files in which only one of the image files is a tooled file.
Figure 17B:
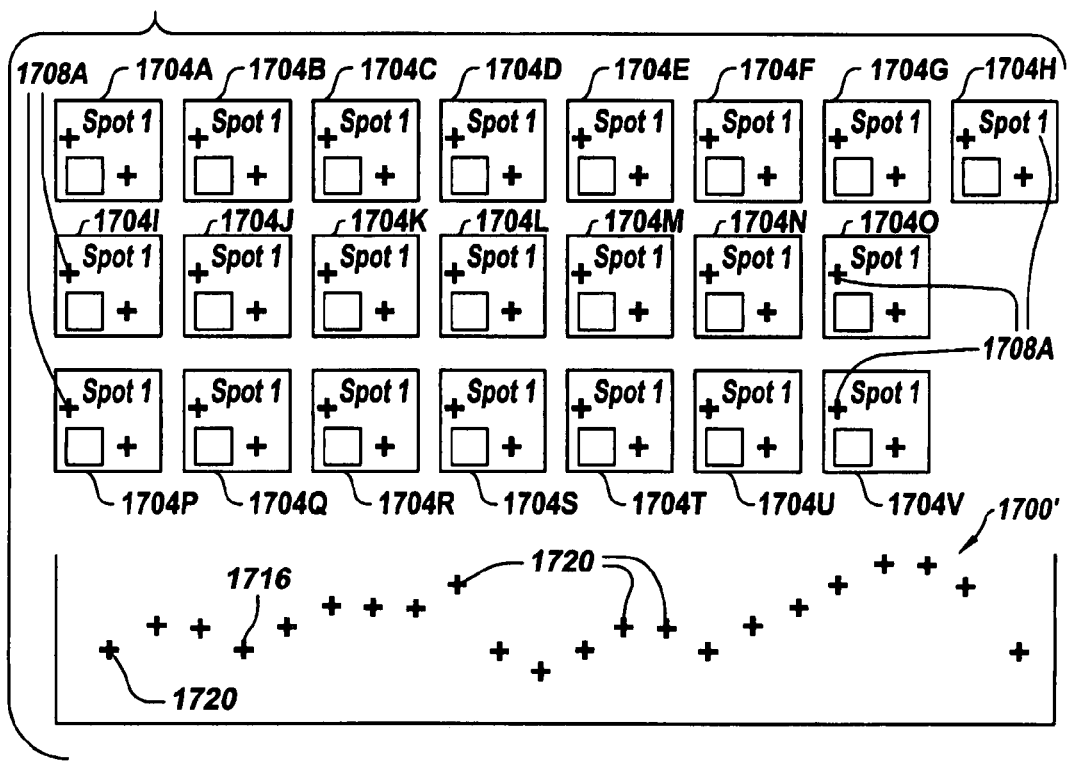
FIG. 17 B is a block diagram and corresponding updated trend graph for the plurality of thermographic image files of FIG. 17A after thermographic tools have been copied from the tooled thermographic image file to each of the non-tooled thermographic image files.

FIGS. 17A-B illustrate an example of an initial trend graph 1700 (FIG. 17A) and an updated trend graph 1700' (FIG. 17B) that is automatically generated after updating of all of the non-tooled thermographic image files 1704A-R, 1704T-V to include the thermographic tools 1708A-B, 1712 initially present in only thermographic image file 1704S. As seen in FIG. 17A, since only one of thermographic image files 1704A-V has any thermographic tools applied thereto, initial trend graph 1700 has a single data point 1716, in this case corresponding to spot temperature tool 1708A. After spot temperature tool 1708A has been copied from thermographic image file 1704S to the rest of the thermographic image files 1704A-R, 1704T-V (in this example all of thermographic tools 1708A-B, 1712 are copied as described above in connection with FIGS. 15A-B), initial trend graph 1700 (FIG. 17A) is automatically updated to updated trend graph 1700' of FIG. 17B so that each of image files 1704A-V has a respective data point 1720 in the updated trend graph that corresponds to spot temperature tool 1708A.

Figure 18:
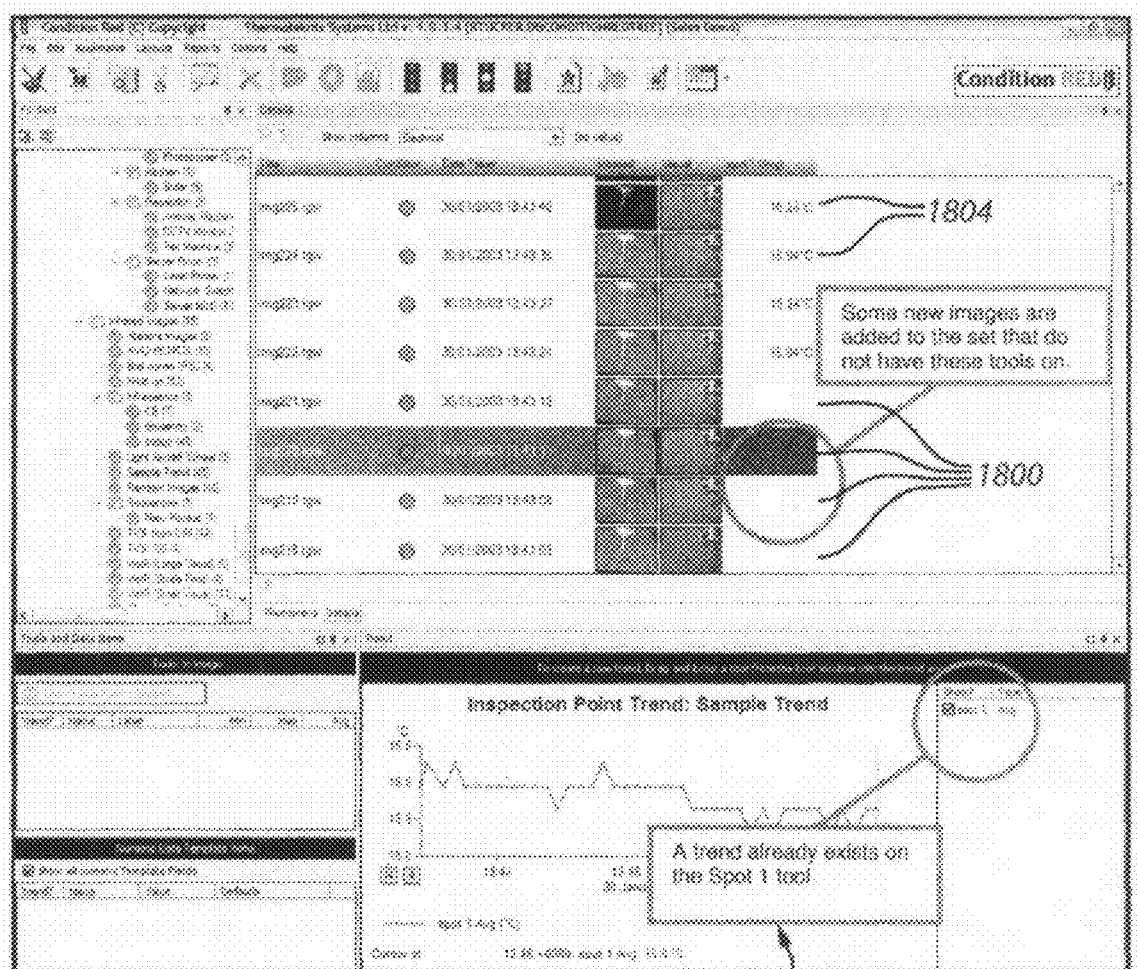
FIG. 18 is a screenshot of the GUI of FIG. 13 illustrating the addition of non-tooled thermographic image files to a selected electronic file folder.
Figure 19:
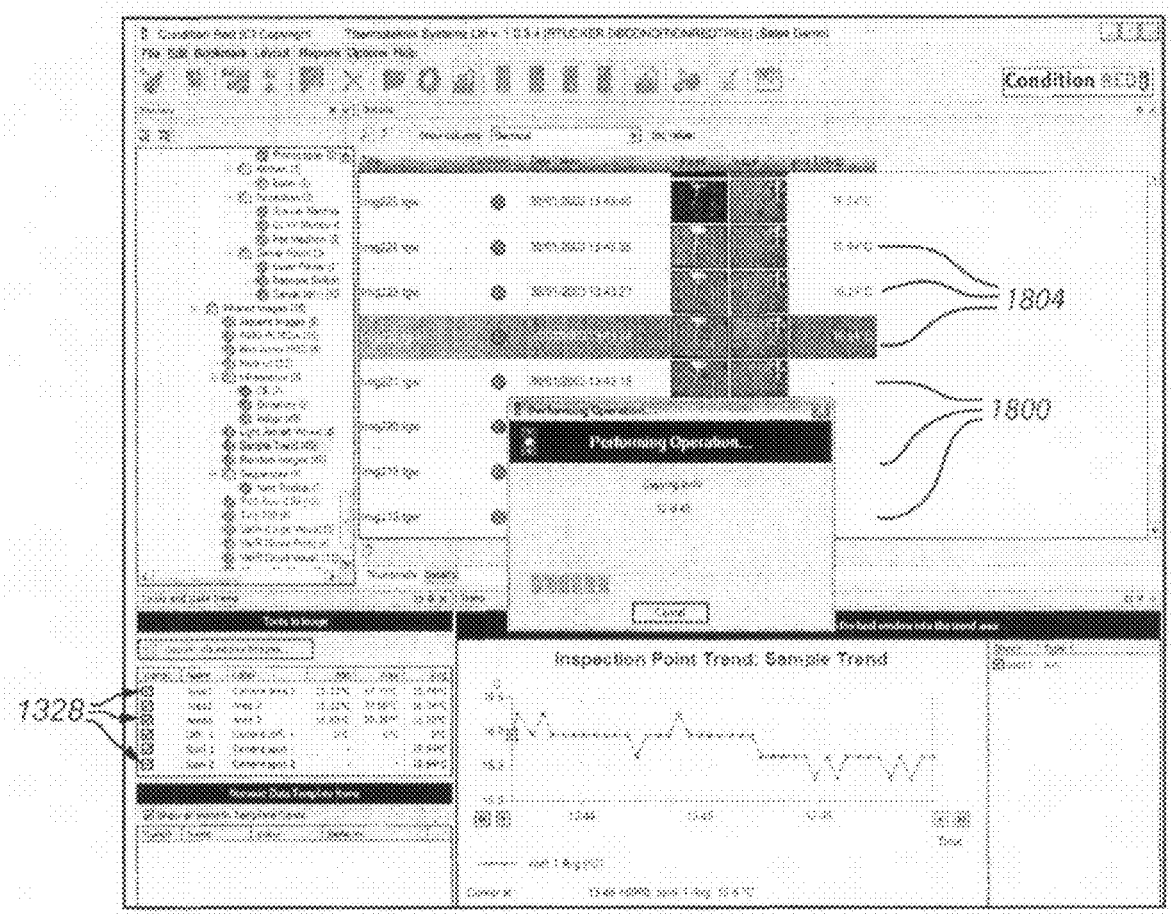
FIG. 19 is a screenshot of the GUI of FIG. 13 illustrating the user-selection of one of the tooled thermographic image files of the selected electronic file folder of FIG. 18 for thermographic tool copying.
Figure 20:
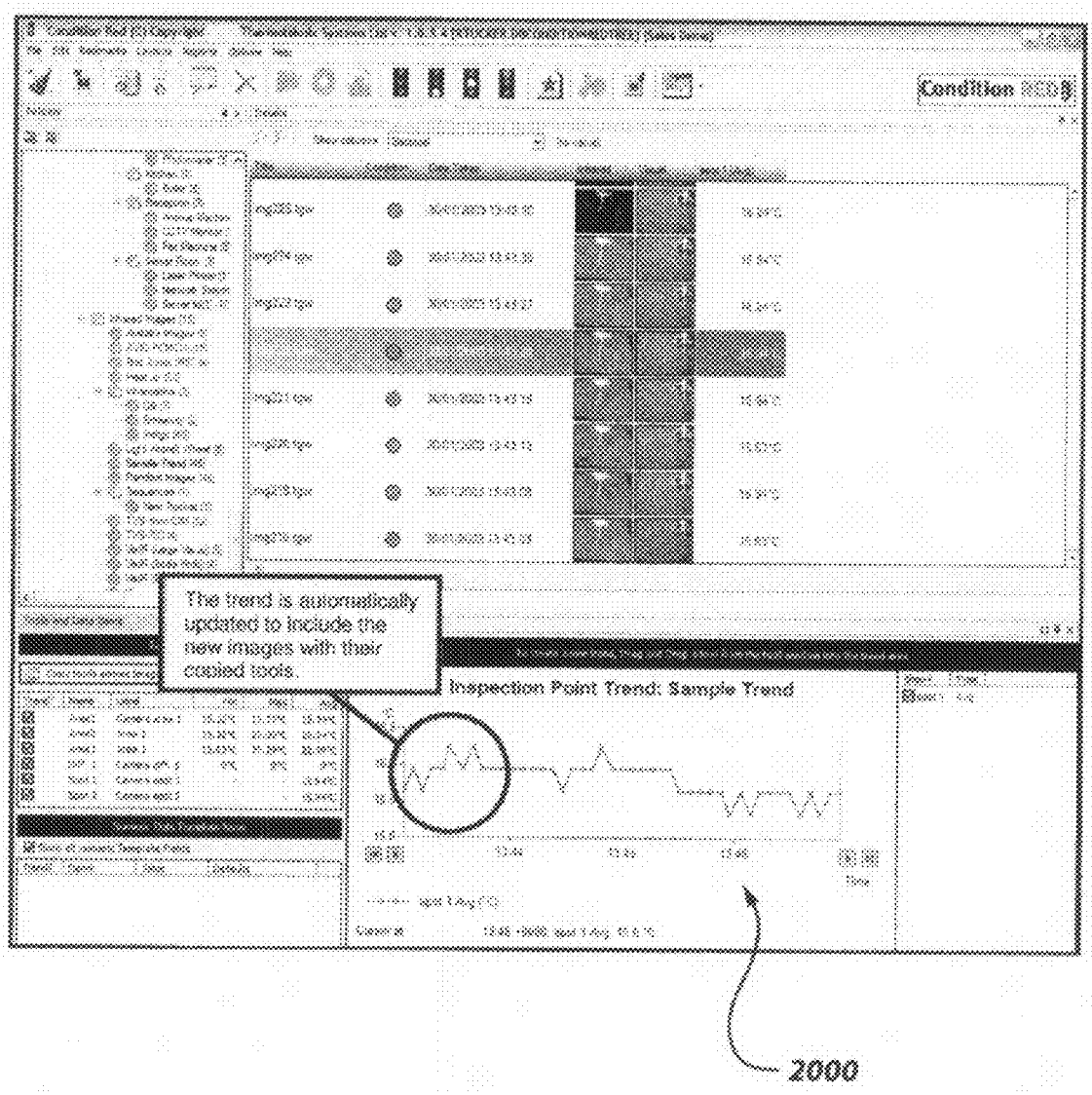
FIG. 20 is a screenshot of the GUI of FIG. 13 illustrating the copying of thermographic tools from the user-selected thermographic image file of FIG. 19 to each of the non-tooled thermographic image files in the selected electronic folder and the automatic updating of the corresponding trend graph.

FIG. 18 illustrates a case when new non-tooled thermographic image files 1800 are added to a folder already containing a set of tooled thermographic image files 1804. In this event, and as illustrated by the highlighted one of tooled thermographic image files 1804 of FIG. 19, a user may select one of the tooled thermographic image files containing a desired one or more thermographic tools 1328 to be copied to the non-tooled thermographic image files 1800. The user may then initiate the copying of the one or more thermographic tools 1328, e.g., using soft button 1336 as described above, or otherwise copy one or more tools from the selected tooled thermographic image file 1804 in one of the alternative copying techniques described above, or other technique. Once the software has provided the thermographic tool(s) to the initially non-tooled thermographic image files 1800, the software may recognize that this action has taken place and, as illustrated in FIG. 20, may automatically update trend graph 1808 of FIG. 18 with any new data points resulting from the newly-tooled thermographic image files for the one or more thermographic tools 1328 under consideration so as to create an updated trend graph 2000. Again, it is noted that in this example there is only a single thermographic tool 1328, i.e., the "Spot 1" tool, represented in trend graphs 1808, 2000 of FIGS. 18 and 20, respectively, but that if more than one tool were present, the trend graph may include a corresponding number of individual plots.

In other embodiments, the software may be configured to automatically recognize that newly added non-tooled (or under-tooled) thermographic image files do not include any (or all) of the thermographic tools present in the existing tooled thermographic image files within a particular folder. When the software recognizes this, it may automatically copy the missing thermographic tool(s) from any one of the existing tooled thermographic image files to each of the non-tooled (or under-tooled) thermographic image files. In one example, this feature may be implemented by providing the software with a file-scanning routine that scans each new thermographic image file added to a particular folder to see whether it has any, all, or none of the thermographic tools that each of the thermographic image file(s) already residing in the folder already have. In other embodiments, a user can specify which one of the existing thermographic image files should be used to update the newly added thermographic image file(s). One example of this automatic updating feature is illustrated in FIGS. 21A-B.

Figure 21A:
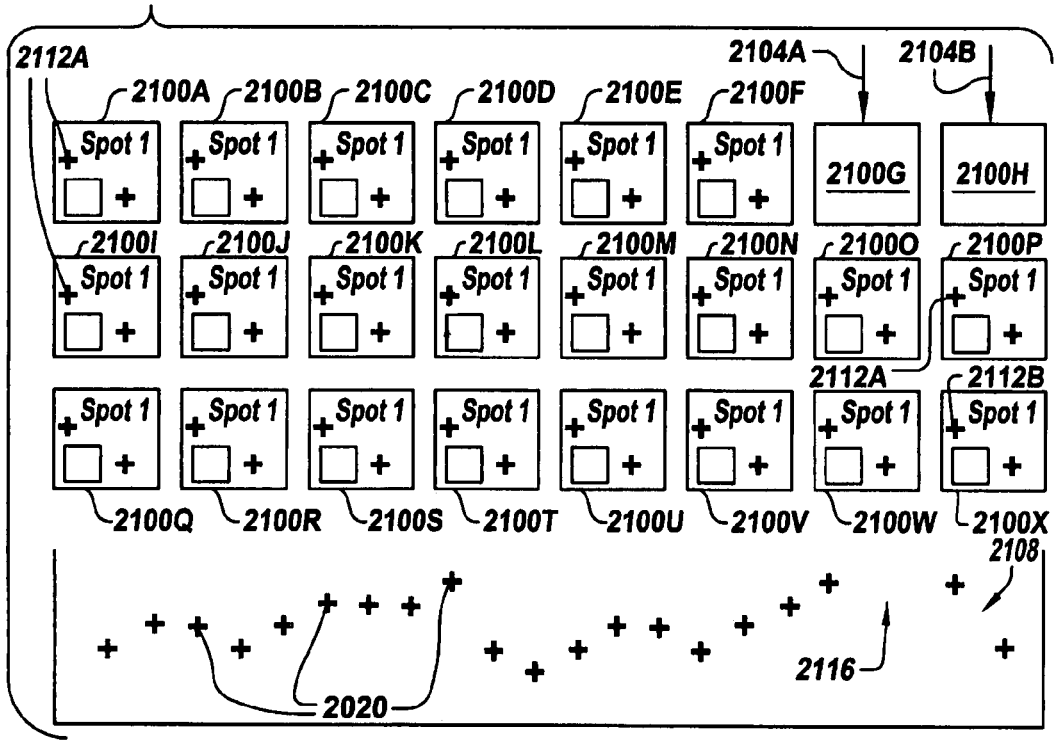
FIG. 21A is a block diagram and trend graph illustrating the addition of a pair of non-tooled thermographic image files to a group of tooled thermographic image files and the corresponding trend graph.
Figure 21B:
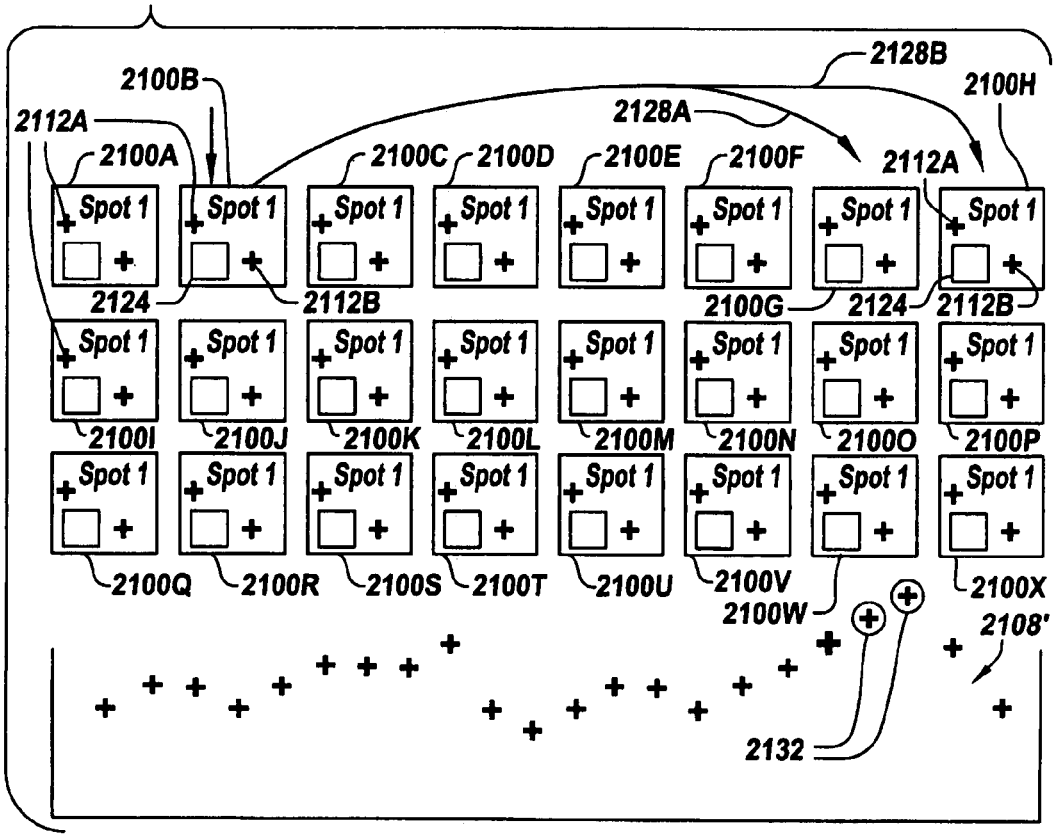
FIG. 21B is a block diagram and updated trend graph illustrating the tooling of the pair of non-tooled thermographic image files of FIG. 21A and the updating of the corresponding trend graph.

Referring to FIGS. 21A-B, FIG. 21A illustrates an example when two non-tooled thermographic image files 2100G-H have been added to a group of tooled thermographic image files 2100A-F, 2100I-X, as indicated by arrows 2104A-B. FIG. 21A also shows a trend graph 2108 for spot temperature tool 2112A for thermographic image files 2100A-F, 2100I-X as it appears prior to newly added thermographic image files 2100G-H being "tooled." Note that a gap 2116 appears in the plot of data points 2120 of trend graph 2108 where data point corresponding to the newly added thermographic image files 2100G-H should be. FIG. 21B, illustrates the copying of spot temperature tool 2112A from a user selected one (image file 2100B) of the existing thermographic image files 2100A-F, 2100I-X (here tools 2112B, 2124 are copied, too) to newly added thermographic image files 2100G-H. The copying is indicated by arrows 2128A-B. Once the desired tool(s) 2112A-B, 2124 have been copied to the previously non-tooled thermographic image files 2100G-H, the software may automatically update trend graph 2108 of FIG. 21A to include the data points 2132 corresponding to the just-tooled image files so as to create the updated trend graph 2108' of FIG. 21B.

Aspects and embodiments described herein may be conveniently implemented using a machine (e.g., a general purpose computing device, such as personal computer 344 of FIG. 3) programmed according to the teachings of the present specification, as will be apparent to those of ordinary skill in the computer arts. Appropriate software coding, i.e., machine executable instructions, can readily be prepared by skilled programmers based on the teachings of the present disclosure, as will be apparent to those of ordinary skill in the software arts.

Such software may be a computer program product that employs a machine-readable medium and/or a machine-readable signal. A machine-readable medium may be any medium that is capable of storing and/or encoding a sequence of instructions for execution by a machine (e.g., a general purpose computing device) and that causes the machine to perform any one of the methodologies and/or embodiments described herein. Examples of a machine-readable medium include, but are not limited to, a magnetic disk (e.g., a conventional floppy disk and a hard drive disk), an optical disk (e.g., a compact disk "CD", such as a readable, writeable, and/or re-writable CD; a digital video disk "DVD", such as a readable, writeable, and/or rewritable DVD), a magneto-optical disk, a read-only memory device, a random access memory device, a magnetic card, an optical card, a solid-state memory device (e.g., a flash memory), an EPROM, an EEPROM, and any combinations thereof. A machine-readable medium, as used herein, is intended to include a single medium as well as a collection of physically separate media, such as, for example, a collection of compact disks or one or more hard disk drives in combination with a computer memory.

Examples of a general purpose computing device include, but are not limited to, a computer workstation, a terminal computer, a server computer, a handheld device (e.g., tablet computer, a personal digital assistant "PDA", a mobile telephone, etc.), a web appliance, a network router, a network switch, a network bridge, any machine capable of executing a sequence of instructions that specify an action to be taken by that machine, and any combinations thereof. In one example, a general purpose computing device may include and/or be included in, a kiosk.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed:

1. A thermographic imaging device, comprising:
   an imaging system configured to capture a live image; an electronic display; a memory containing a reference image and thermographic tool data corresponding to said reference image; and
   a display driver operatively configured to drive said display so as to display simultaneously each of said live image and said reference image for assisting a user in aligning said live image with said reference image.

2. The thermographic imaging device of claim 1, wherein said display driver is configured to display, on said electronic display, said live image in a first primary image region and display said reference image in a second primary image region differing from said first primary image region.

3. The thermographic imaging device of claim 2, wherein each of said live image and said reference image is a thermographic image.

4. The thermographic imaging device of claim 2, wherein each of said live image and said reference image is a visual image.

5. The thermographic imaging device of claim 2, wherein said display driver is configured to display a first thermographic tool representation within said reference image and display a second thermographic tool representation within said live image, said first thermographic tool representation having a first position within said second primary image region and said second thermographic tool representation having a second position within said first primary region that corresponds to said first position of said first thermographic tool representation.

6. The thermographic imaging device of claim 1, wherein said display driver is configured to overlay said live image and said reference image with one another in a common primary image region on said electronic display.

7. The thermographic imaging device of claim 6, wherein when said display driver displays said live image and said reference image in said common primary image region said live image and said reference image have a relative intensity relative to one another, the thermographic imaging device further comprising a user control for adjusting said relative intensity.

8. The thermographic imaging device of claim 7, wherein said user control includes a joystick.

9. The thermographic imaging device of claim 7, wherein said electronic display includes a touch-responsive feature and said user control utilizes said touch-responsive feature for receiving user input for changing said relative intensity.

10. The thermographic imaging device of claim 6, wherein each of said live image and said reference image is a thermographic image.

11. The thermographic imaging device of claim 6, wherein each of said live image and said reference image is a visual image.

12. The thermographic imaging device of claim 6, wherein said display driver is configured to display said reference image in a second primary image region adjacent said common primary image region.

13. The thermographic imaging device of claim 12, wherein said display driver is configured to display a first thermographic tool representation within said second primary image region and display a second thermographic tool representation within said common primary image region, said first thermographic tool representation having a first position within said second primary image region and said second thermographic tool representation having a second position within said common primary region that corresponds to said first position of said first thermographic tool representation.

14. The thermographic imaging device of claim 1, further comprising a graphical user interface that includes a survey mode and an image compare mode for assisting a user in aligning said live image with said reference image, said graphical user interface including controls for toggling into and out of said survey mode and said image compare mode.

15. The thermographic imaging device of claim 1, wherein said display driver is configured to display a multipurpose region on said electronic display, said multipurpose region configured to display a thumbnail of said reference image.

16. A thermographic camera, comprising:
   an imaging system configured to capture a live image;
   an electronic display;
   a memory containing a previously captured image and thermographic tool data corresponding to said previously captured image;
   and a display driver operatively configured to drive said electronic display so as to display an overlay comprising said live image and said previously captured image.

17. The thermographic camera of claim 16, wherein when said display driver displays said overlay said live image and said previously captured image have a relative intensity relative to one another, the thermographic camera further comprising an image intensity control in communication with said display driver for controlling said relative intensity.

18. The thermographic imaging device of claim 17, wherein said image intensity control includes a joystick.

19. The thermographic imaging device of claim 17, wherein said electronic display includes a touch-responsive feature and said image intensity control utilizes said touch-responsive feature for receiving user input for changing said relative intensity.

20. The thermographic imaging device of claim 16, wherein each of said live image and said previously captured image is a thermographic image.

21. A method of capturing a thermographic image of a subject using a previously captured image of the subject, the method comprising:
   capturing a live image of the subject;
   displaying said live image to a user;
   displaying the previously captured image of the subject to the user simultaneously with said live image so as to allow the user to visually align said live image with the previously captured image;
   displaying to the user one or more thermographic tools overlaid with said live image;
   wherein displaying one or more thermographic tools includes displaying said one or more thermographic tools as a function of one or more corresponding respective thermographic tools associated with the previously captured image;

aligning, in response to aligning movements by the user, said live image with said reference image; and capturing, in response to user input, a thermographic still image of said live image when said live image and said reference image are aligned to the satisfaction of the user.

22. The method of claim 21, further comprising displaying to the user said live image and the previously captured image in differing display regions.

23. The method of claim 21, further comprising displaying to the user an overlay image comprising said live image and the previously captured image.

24. The method of claim 23, wherein said live image and the previously captured image have a relative intensity in said overlay image, the method further comprising adjusting said relative intensity.

25. A machine readable medium containing machine executable instructions for performing a method of capturing a thermographic image of a subject using a previously captured image of the subject, said machine executable instructions comprising:

a first set of machine executable instructions for capturing a live image of the subject;

a second set of machine executable instructions for displaying said live image to a user;

a third set of machine executable instructions for displaying the previously captured image of the subject to the user simultaneously with said live image so as to allow the user to visually align said live image with the previously captured image; and a fourth set of machine executable instructions for capturing, in response to user input, a thermographic still image of said live image when said live image and said reference image are aligned to the satisfaction of the user;

a fifth set of machine executable instructions for displaying to the user one or more thermographic tools overlaid with said live image; and wherein the fifth set of machine executable instructions for displaying one or more thermographic tools includes machine executable instructions for displaying said one or more thermographic tools as a function of one or more corresponding respective thermographic tools associated with the previously captured image.

26. The machine readable medium of claim 25, further comprising a sixth set of machine executable instructions for displaying to the user said live image and the previously captured image in differing display regions.

27. The machine readable medium of claim 25, further comprising a sixth set of machine executable instructions for displaying to the user an overlay image comprising said live image and the previously captured image.

28. The machine readable medium of claim 27, wherein said live image and the previously captured image have a relative intensity in said overlay image, the machine readable medium further comprising a seventh set of machine executable instructions for adjusting said relative intensity.

\* \* \* \* \*